United States Patent
Yonaha

(10) Patent No.: US 9,773,171 B2
(45) Date of Patent: Sep. 26, 2017

(54) EVENT TAKEN-PICTURE ARRANGEMENT DEVICE, CONTROL METHOD THEREOF AND CONTROL PROGRAM THEREOF

(71) Applicant: FUJIFILM Corporation, Tokyo (JP)

(72) Inventor: Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/058,592

(22) Filed: Mar. 2, 2016

(65) Prior Publication Data
US 2016/0180172 A1 Jun. 23, 2016

Related U.S. Application Data

(63) Continuation of application No. PCT/JP2014/067735, filed on Jul. 3, 2014.

(30) Foreign Application Priority Data

Sep. 5, 2013 (JP) .................................. 2013-183589

(51) Int. Cl.
*G06K 9/62* (2006.01)
*G06K 9/00* (2006.01)
(Continued)

(52) U.S. Cl.
CPC ..... *G06K 9/00724* (2013.01); *G06F 3/04817* (2013.01); *G06F 3/04845* (2013.01);
(Continued)

(58) Field of Classification Search
None
See application file for complete search history.

(56) References Cited

U.S. PATENT DOCUMENTS

| 6,351,556 | B1* | 2/2002 | Loui ..................... G06K 9/4647 382/164 |
| 2005/0134946 | A1* | 6/2005 | Tsue ........................ G06T 11/60 358/537 |

(Continued)

FOREIGN PATENT DOCUMENTS

| JP | 2003-281163 A | 10/2003 |
| JP | 2005-184791 A | 7/2005 |

(Continued)

OTHER PUBLICATIONS

Cooper, Matthew, et al. "Temporal event clustering for digital photo collections." ACM Transactions on Multimedia Computing, Communications, and Applications (TOMM) 1.3 (2005): 269-288. 20 pages.*

(Continued)

*Primary Examiner* — Ryan P Potts
(74) *Attorney, Agent, or Firm* — Studebaker & Brackett PC

(57) ABSTRACT

Disclosed are an event-specific taken picture arrangement device, a control method thereof and a control program thereof capable of efficiently observing the status of a change of a specific object by event. Multiple pictures P are divided into event picture groups ga1, gb1, gc1, and the like by event using a picture-taking date. The event picture groups ga1 and the like are further grouped into a plurality of groups of taken picture Ev1 to Ev6 by identical event. The taken pictures P of the identical event are consecutively arranged in an electronic album by identical event.

17 Claims, 22 Drawing Sheets

(51) Int. Cl.
  *H04N 1/387* (2006.01)
  *H04N 5/232* (2006.01)
  *H04N 5/76* (2006.01)
  *G06F 3/0481* (2013.01)
  *G06F 3/0484* (2013.01)
  *G06F 17/30* (2006.01)

(52) U.S. Cl.
  CPC .... *G06F 17/3028* (2013.01); *G06F 17/30265* (2013.01); *H04N 1/3876* (2013.01); *H04N 5/23216* (2013.01); *H04N 5/76* (2013.01); *G06K 2009/00738* (2013.01)

(56) References Cited

U.S. PATENT DOCUMENTS

| | | | |
|---|---|---|---|
| 2005/0141849 A1* | 6/2005 | Tsue | G11B 27/034 386/282 |
| 2006/0071942 A1 | 4/2006 | Ubillos et al. | |
| 2007/0019924 A1* | 1/2007 | Teo | H04N 1/00132 386/278 |
| 2007/0081088 A1* | 4/2007 | Gotoh | G06F 17/30265 348/333.01 |
| 2010/0088617 A1* | 4/2010 | Watanabe | G06T 11/60 715/762 |
| 2011/0280476 A1* | 11/2011 | Berger | G06F 17/30274 382/163 |
| 2014/0093174 A1* | 4/2014 | Zhang | G06F 17/30259 382/190 |

FOREIGN PATENT DOCUMENTS

| | | |
|---|---|---|
| JP | 2006-345492 A | 12/2006 |
| JP | 2007-243485 A | 9/2007 |
| JP | 2007-257312 A | 10/2007 |
| JP | 2008-250555 A | 10/2008 |
| JP | 2013-520725 A | 6/2013 |

OTHER PUBLICATIONS

Jang, Chul-Jin, et al. "Smart management system for digital photographs using temporal and spatial features with exif metadata." Digital Information Management, 2007. ICDIM'07. 2nd International Conference on. vol. 1. IEEE, 2007. 6 pages.*
International Search Report—PCT/JP2014/067735 mailed Oct. 7, 2014.
Written Opinion—PCT/JP2014/067735 mailed Oct. 7, 2014.
International Preliminary Report on Patentability of the International Preliminary Examining Authority; PCT/JP2014/067735 dated Feb. 6, 2015.
An Office Action "Notification of Reasons for Refusal" issued by the Japanese Patent Office on Sep. 6, 2016, which corresponds to Japanese Patent Application No. 2013-183589 and is related to U.S. Appl. No. 15/058,592; with English language translation.
The extended European search report issued by the European Patent Office on May 10, 2017, which corresponds to Patent Application No. 14841648.0-1903 and is related to U.S. Appl. No. 15/058,592.

* cited by examiner

FIG. 3

| EVENT ID | YEAR AND MONTH OF PICTURE-TAKING | PICTURE-TAKING PLACE | EVENT NAME |
|---|---|---|---|
| ID1 | 2007.04 | LONGITUDE aa DEGREES EAST, LATITUDE bb DEGREES NORTH | ENTRANCE CEREMONY |
| ID2 | 2007.05 | LONGITUDE aa DEGREES EAST, LATITUDE bb DEGREES NORTH | ATHLETIC MEETING |
| ID3 | 2007.07 | LONGITUDE cc DEGREES EAST, LATITUDE dd DEGREES NORTH | SCHOOL EXCURSION |
| ID4 | 2007.09 | LONGITUDE aa DEGREES EAST, LATITUDE bb DEGREES NORTH | SCHOOL FESTIVAL |
| ID5 | 2008.05 | LONGITUDE aa DEGREES EAST, LATITUDE bb DEGREES NORTH | ATHLETIC MEETING |
| ID6 | 2008.07 | LONGITUDE ee DEGREES EAST, LATITUDE ff DEGREES NORTH | SCHOOL EXCURSION |
| ID7 | 2008.09 | LONGITUDE aa DEGREES EAST, LATITUDE bb DEGREES NORTH | SCHOOL FESTIVAL |
| ID8 | 2009.05 | LONGITUDE aa DEGREES EAST, LATITUDE bb DEGREES NORTH | ATHLETIC MEETING |
| ID9 | 2009.07 | LONGITUDE gg DEGREES EAST, LATITUDE hh DEGREES NORTH | SCHOOL EXCURSION |
| ID10 | 2009.09 | LONGITUDE aa DEGREES EAST, LATITUDE bb DEGREES NORTH | SCHOOL FESTIVAL |
| ID11 | 2009.10 | LONGITUDE ii DEGREES EAST, LATITUDE jj DEGREES NORTH | SCHOOL TRIP |
| ID12 | 2010.03 | LONGITUDE aa DEGREES EAST, LATITUDE bb DEGREES NORTH | GRADUATION CEREMONY |

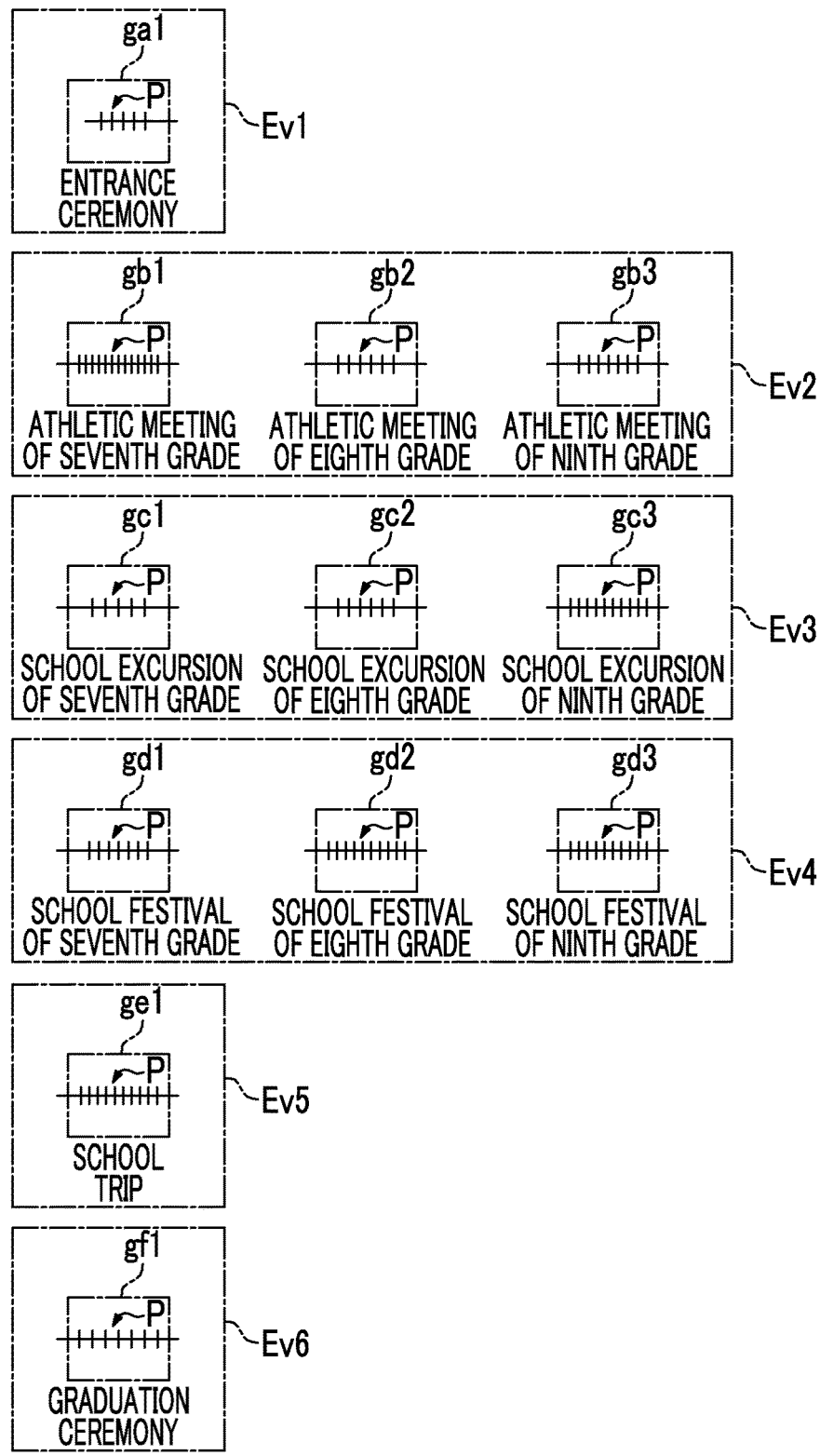

FIG. 9

| EVENT | TAKEN PICTURE | | | |
|---|---|---|---|---|
| ENTRANCE CEREMONY | P11 | P12 | | |
| ATHLETIC MEETING | P21 | P22 | P23 | P24 |
| SCHOOL EXCURSION | P31 | P32 | P33 | P34 |
| SCHOOL FESTIVAL | P41 | P42 | P43 | P44 |
| SCHOOL TRIP | P51 | P52 | P53 | P54 |
| GRADUATION CEREMONY | P61 | P62 | | |

FIG. 17

| EVENT ID | YEAR AND MONTH OF PICTURE-TAKING | PICTURE-TAKING PLACE | EVENT NAME |
|---|---|---|---|
| ID1 | 2007.04 | LONGITUDE aa DEGREES EAST, LATITUDE bb DEGREES NORTH | ENTRANCE CEREMONY |
| ID2 | 2007.05 | LONGITUDE aa DEGREES EAST, LATITUDE bb DEGREES NORTH | ATHLETIC MEETING |
| ID3 | 2007.07 | LONGITUDE cc DEGREES EAST, LATITUDE dd DEGREES NORTH | SCHOOL EXCURSION |
| ID4 | 2007.09 | LONGITUDE aa DEGREES EAST, LATITUDE bb DEGREES NORTH | SCHOOL FESTIVAL |
| ID5 | 2008.05 | LONGITUDE aa DEGREES EAST, LATITUDE bb DEGREES NORTH | ATHLETIC MEETING |
| ID6 | 2008.07 | LONGITUDE ee DEGREES EAST, LATITUDE ff DEGREES NORTH | SCHOOL EXCURSION |
| ID7 | 2008.09 | LONGITUDE aa DEGREES EAST, LATITUDE bb DEGREES NORTH | SCHOOL FESTIVAL |
| ID8 | 2009.05 | LONGITUDE aa DEGREES EAST, LATITUDE bb DEGREES NORTH | ATHLETIC MEETING |
| ID9 | 2009.07 | LONGITUDE gg DEGREES EAST, LATITUDE hh DEGREES NORTH | SCHOOL EXCURSION |
| ID10 | 2009.09 | LONGITUDE aa DEGREES EAST, LATITUDE bb DEGREES NORTH | SCHOOL FESTIVAL |
| ID11 | 2009.10 | LONGITUDE ii DEGREES EAST, LATITUDE jj DEGREES NORTH | SCHOOL TRIP |
| ID12 | 2010.03 | LONGITUDE aa DEGREES EAST, LATITUDE bb DEGREES NORTH | GRADUATION CEREMONY |
| ID13 | 2010.04 | LONGITUDE kk DEGREES EAST, LATITUDE mm DEGREES NORTH | ENTRANCE CEREMONY |
| ID14 | 2010.05 | LONGITUDE kk DEGREES EAST, LATITUDE mm DEGREES NORTH | ATHLETIC MEETING |
| ID15 | 2010.07 | LONGITUDE nn DEGREES EAST, LATITUDE pp DEGREES NORTH | SCHOOL EXCURSION |
| ID16 | 2010.09 | LONGITUDE kk DEGREES EAST, LATITUDE mm DEGREES NORTH | SCHOOL FESTIVAL |
| ID17 | 2011.05 | LONGITUDE kk DEGREES EAST, LATITUDE mm DEGREES NORTH | ATHLETIC MEETING |
| ID18 | 2011.07 | LONGITUDE qq DEGREES EAST, LATITUDE rr DEGREES NORTH | SCHOOL EXCURSION |
| ID19 | 2011.09 | LONGITUDE kk DEGREES EAST, LATITUDE mm DEGREES NORTH | SCHOOL FESTIVAL |
| ID20 | 2012.05 | LONGITUDE kk DEGREES EAST, LATITUDE mm DEGREES NORTH | ATHLETIC MEETING |
| ID21 | 2012.07 | LONGITUDE ss DEGREES EAST, LATITUDE tt DEGREES NORTH | SCHOOL EXCURSION |
| ID22 | 2012.09 | LONGITUDE kk DEGREES EAST, LATITUDE mm DEGREES NORTH | SCHOOL FESTIVAL |
| ID23 | 2012.10 | LONGITUDE uu DEGREES EAST, LATITUDE vv DEGREES NORTH | SCHOOL TRIP |
| ID24 | 2013.03 | LONGITUDE kk DEGREES EAST, LATITUDE mm DEGREES NORTH | GRADUATION CEREMONY |

FIG. 19

| EVENT | TAKEN PICTURE | | | | |
|---|---|---|---|---|---|
| ENTRANCE CEREMONY | P1 | P11 / P101 | | | |
| ATHLETIC MEETING | P2 | P22 | P23 | P201 | P202 / P203 |
| SCHOOL EXCURSION | P3 | P32 | P33 | P301 | P302 / P303 |
| SCHOOL FESTIVAL | P4 | P42 | P43 | P401 | P402 / P403 |
| SCHOOL TRIP | P5 | P52 | P53 | P501 | P502 / P503 |
| GRADUATION CEREMONY | P6 | P601 | | | |

EVENT TAKEN-PICTURE ARRANGEMENT DEVICE, CONTROL METHOD THEREOF AND CONTROL PROGRAM THEREOF

CROSS-REFERENCE TO RELATED APPLICATIONS

This application is a Continuation of PCT International Application No. PCT/JP2014/067735 filed on Jul. 3, 2014, which claims priority under 35 U.S.C. §119(a) to Japanese Patent Application No. 2013-183589 filed Sep. 5, 2013. Each of the above application(s) is hereby expressly incorporated by reference, in its entirety, into the present application.

BACKGROUND OF THE INVENTION

1. Field of the Invention

The present invention relates to a device for arranging taken pictures by event, and a control method thereof and a control program thereof.

2. Description of the Related Art

An electronic album allows multiple taken pictures taken by a digital camera or the like to be viewed like a photograph album. Such an electronic album is displayed on a display screen and viewed, and can also be printed as a paper album.

When automatically creating an electronic album, in general, pictures are arranged in the order of picture-taking date and time (JP2008-250555A, JP2007-243485A). Furthermore, when detecting events of multiple pictures, the events are arranged in a time-series order (JP2013-520725A).

SUMMARY OF THE INVENTION

However, as in JP2008-250555A, JP2007-243485A, and JP2013-520725A, when the pictures are arranged in the order of picture-taking date and time, it is not possible to efficiently observe the status of a change of a specific object by event.

An object of the invention is to allow the status of a change of a specific object to be efficiently observed by event.

An event-specific taken picture arrangement device according to the invention includes a grouping device for grouping multiple taken pictures by identical event to generate a plurality of groups of taken picture, and a taken picture arrangement device for consecutively arranging the taken pictures included in each of the plurality of groups of taken picture generated by the grouping device in the picture-taking order by identical event. The identical event refers to that an event, such as an athletic meeting, a school festival, or a school excursion, is identical, and even events which are held on different days of different months in different years become an identical event. Events themselves may be identical.

The invention also provides an operation control method suitable for the event-specific taken picture arrangement device. That is, the operation control method includes a causing grouping device to group multiple taken pictures by identical event to generate a plurality of groups of taken picture, and a causing taken picture arrangement device to consecutively arrange the taken pictures included in each of the plurality of groups of taken picture generated by the grouping device in the picture-taking order by identical event.

The invention provides a non-transitory recording medium storing computer-readable program for executing the operation control method of the event-specific taken picture arrangement device.

According to the invention, the multiple taken pictures are grouped by identical event to generate a plurality of groups of taken picture. The taken pictures included in each of the plurality of generated groups of taken picture are consecutively arranged in the picture-taking order by identical event. Since the taken pictures of the identical event are consecutively arranged, it is possible to efficiently observe the status of a change of a specific object by event.

For example, the grouping device includes an event picture group generation device for grouping multiple taken pictures by event to generate a plurality of event picture groups, and the plurality of event picture groups generated by the event picture group generation device are grouped by identical event to generate a plurality of groups of taken picture. The taken picture arrangement device consecutively arranges the taken pictures included in each of the plurality of event picture groups generated by the event picture group generation device in the picture-taking order by identical event.

For example, the grouping device may group multiple taken pictures while regarding the taken pictures at the identical timing as the taken pictures of the identical event.

The grouping device groups multiple taken pictures while regarding the taken pictures at the identical timing and the identical picture-taking place as the taken picture of the identical event.

When the taken pictures are associated with event names, the grouping device may group multiple taken pictures while regarding the taken pictures at the identical timing and with the identical event name as the taken pictures of the identical event.

The event-specific taken picture arrangement device may further include first arrangement change device for changing the arrangement of the taken pictures arranged by the taken picture arrangement device.

The event-specific taken picture arrangement device may further include second arrangement change device for changing the arrangement of the taken pictures arranged in the picture-taking order by identical event by the taken picture arrangement device in terms of events.

For example, the first arrangement change device includes first display control device for performing control such that a display device displays the taken pictures arranged by the taken picture arrangement device on a display screen, and a taken picture arrangement change command device for giving a change command to the event-specific taken picture arrangement device to change the arrangement of the taken pictures displayed on the display screen.

The second arrangement change device may include second display control device for performing control such that a display device displays event icons indicating events on a display screen, and an event icon arrangement change device for changing the order of the event icons displayed on the display screen, and the taken picture arrangement device may consecutively arrange the taken pictures in the picture-taking order by identical event according to the order of the events indicated by the event icons changed by the event icon arrangement change device.

The event-specific taken picture arrangement device may further include an electronic album generation device for generating an electronic album using the taken pictures arranged by the taken picture arrangement device.

It is preferable that the electronic album generation device arranges the taken pictures of the identical event on an identical page or a spread page.

The taken picture arrangement device may consecutively arrange the taken pictures included in each of the plurality of groups of taken picture generated by the grouping device in the picture-taking order by identical event and may arrange the taken pictures in a time-series order of the event timing of the event represented by the taken pictures.

The event-specific taken picture arrangement device may further include a picture file reception device for receiving a picture file representing multiple taken pictures. In this case, for example, the grouping device may group the multiple taken pictures represented by the picture file received by the picture file reception device by identical event.

Since the taken pictures of the identical event are consecutively arranged, it is possible to efficiently observe the status of a change of a specific object by event.

BRIEF DESCRIPTION OF THE DRAWINGS

FIG. 3 is an example of an event information table.

FIG. 4 shows a status in which taken pictures are divided by identical event.

FIG. 9 is an example of taken pictures selected by identical event.

FIG. 17 is an example of an event information table.

FIG. 19 is an example of taken pictures selected by identical event.

DESCRIPTION OF THE PREFERRED EMBODIMENTS

Figure 1:
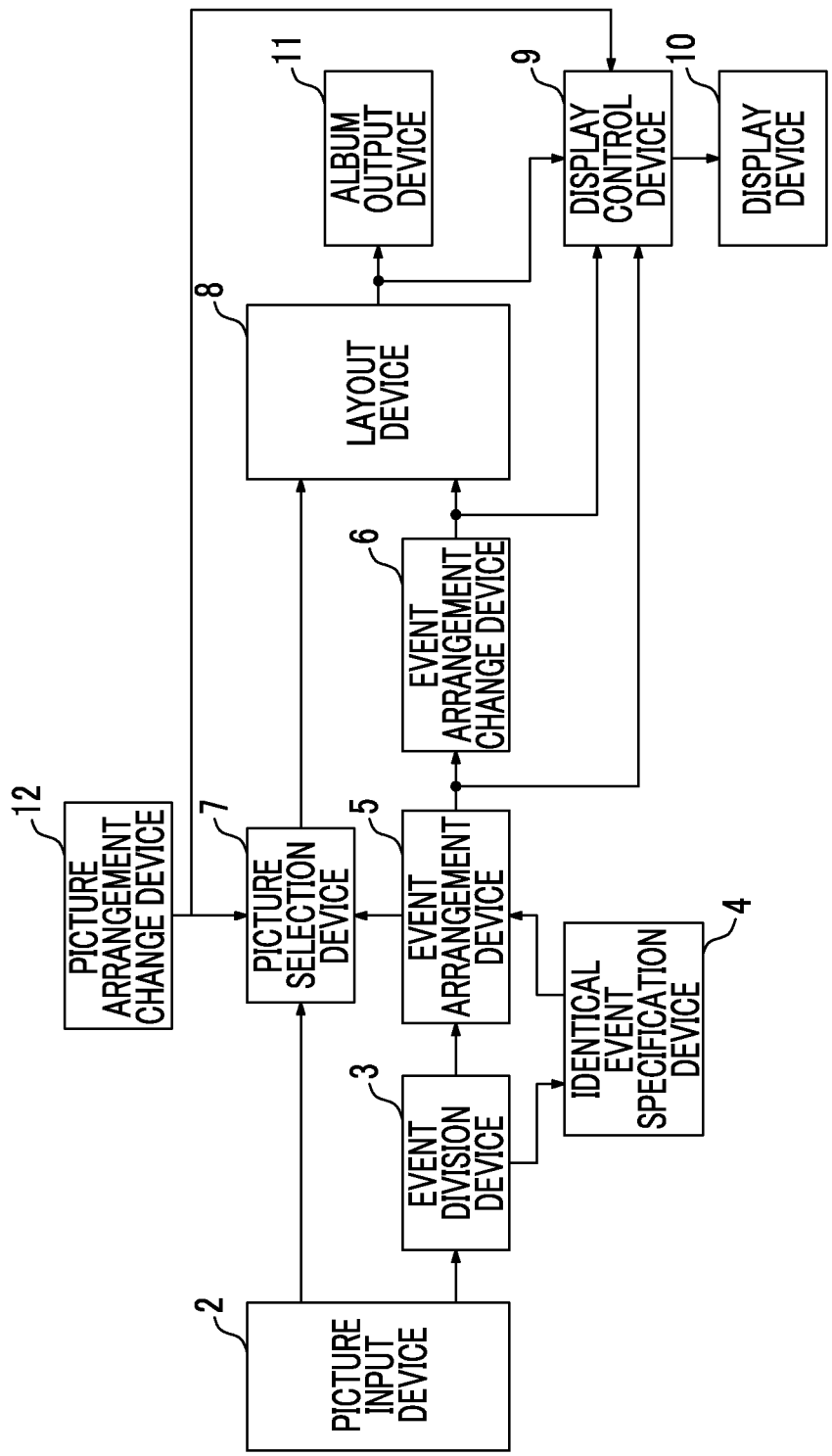
FIG. 1 is a block diagram showing the electrical configuration of an electronic album generation device.

FIG. 1 is a block diagram showing the electrical configuration of an electronic album generation device 1 (event taken picture arrangement device). The electronic album generation device 1 is disposed at a store, such as a supermarket or a convenience store.

The electronic album generation device 1 have taken pictures which are arranged such that the taken picture of the identical event are consecutive.

Multiple taken pictures recorded in a memory cared are read by a picture input device 2. The read multiple taken pictures are input to an event division device 3 and a picture selection device 7. In the event division device 3, the taken pictures are divided by event based on the year and month of picture-taking (picture-taking date).

Figure 2:
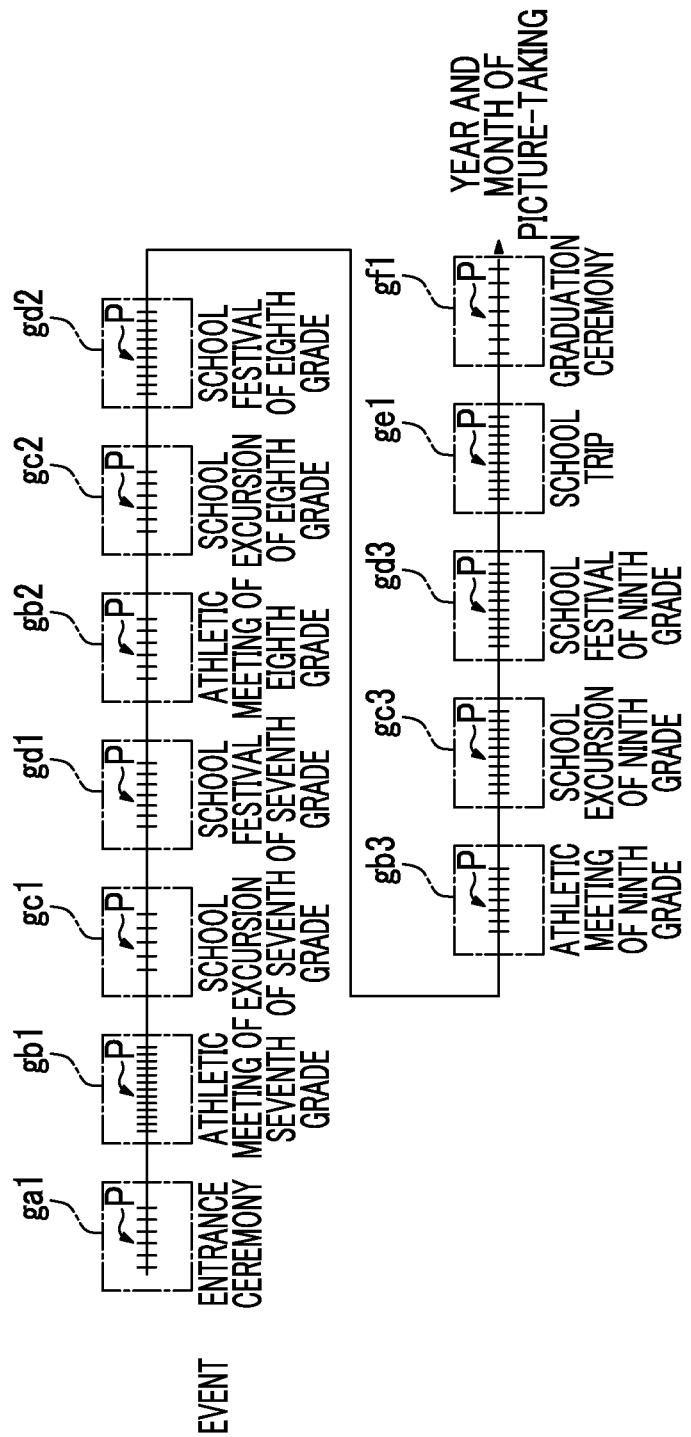
FIG. 2 shows a status in which taken pictures are divided by event.

FIG. 2 shows a status in which multiple taken pictures P are grouped by event and event picture groups are generated.

The horizontal axis is the year and month of picture-taking, and a status in which the taken pictures P of a certain object for three years in a junior high school are arranged in the order of picture-taking date.

When there is an event, the number of taken pictures P on the date on which the event is held is increased. For this reason, if the taken pictures P are divided based on the date on which the number of taken pictures is increased, the taken pictures can be divided by event. It is needless to say that information regarding the year and month of picture-taking is recorded in the header of each taken picture. When the header of each taken picture P also includes global positioning system (GPS) information indicating a picture-taking place, the taken pictures P are divided by even using the GPS information simultaneously. For example, in the case of an event, such as an athletic meeting, a school excursion, or a school festival, which is held every year in a junior high school, since the junior high school is a picture-taking place, the taken pictures P having the picture-taking place of the junior high school in common are determined to be the taken pictures P of the events, such as an athletic meeting, a school excursion, or a school festival. When an event name is attached to each taken picture P or an event name is attached to a folder which stores files representing the taken pictures P, the taken pictures P are divided by event using the event name.

An event picture group ga1 includes taken pictures P of an event of an entrance ceremony of a junior high school. Similarly, a group gb1 includes taken pictures P of an event of an athletic meeting in a seventh grade, a group gc1 includes taken pictures P of an event of a school excursion in the seventh grade, and a group gd1 includes taken pictures P of an event of a school festival in the seventh grade. A group gb2 includes taken pictures P of an event of an athletic meeting in an eighth grade, a group gc2 includes taken pictures P of an event of a school excursion in the eighth grade, and a group gd2 includes taken pictures P of an event of a school festival in the eighth grade. A group gb3 includes taken pictures P of an event of an athletic meeting in a ninth grade, a group gc3 includes taken pictures P of an event of a school excursion in the ninth grade, and a group gd3 includes taken pictures P of an event of a school festival in the ninth grade. A group ge1 includes taken pictures P of an event of a school trip, and a group gf1 includes taken pictures P of an event of a graduation ceremony of the junior high school.

In this way, the multiple taken pictures P are divided by event, and a plurality of event picture groups are generated.

FIG. 3 is an example of an event information table.

The event information table is generated when the taken pictures P are divided into groups (event picture groups) by event in the event division device 3.

In the event information table, an event ID (group ID) for identifying each event picture group divided in the above-described manner, the year and month of picture-taking and a picture-taking place of each taken picture included in the group specified by the event ID, and an event name of the group (event) specified by the event ID are stored. The year and month of picture-taking is shown in a monthly order of the A.D. representation.

Event IDs ID1, ID2, ID3, ID4, ID5, ID6, ID7, ID8, ID9, ID10, and ID11 correspond to the groups ga1, gb1, gc1, gd1, gb2, gc2, gd2, gb3, gc3, gd3, ge1, and gf1 shown in FIG. 2. The event ID ID1 indicates an event of an entrance ceremony, and the picture-taking place of each taken picture P of the event specified by the event ID ID1 is a place of the junior high school (longitude aa degrees east, latitude bb degrees north). Similarly, the event IDs ID2, ID5, and ID8 indicate an event of an athletic meeting, and the picture-taking place of each taken picture P of the event specified by the event IDs ID2, ID5, and ID8 is a place of the junior high school. The month of picture-taking of the event specified by the event IDs ID2, ID5, and ID8 is May, and it is understood to be the identical event at the identical timing. The same applies to the event of the school festival specified by the event IDs ID4, ID7, and ID10.

Picture data which represents the taken pictures divided by event in the event division device 3 of FIG. 1 is given to an identical event specification device 4 (grouping means). The identical event specification device 4 specifies whether or not the taken pictures belong to the identical event.

FIG. 4 shows a status the taken pictures divided into the event picture group ga1 and the like as shown in FIG. 2 are put together by identical event to generate a plurality of groups of taken picture.

A plurality of groups of taken picture are generated using the event information table shown in FIG. 3.

The group ga1 specified by the event ID1 becomes a single group of taken picture Ev1 since there is no taken picture P at the identical picture-taking timing at other groups and there is no taken picture P with an event name identical to the event name.

The groups gb1, gb2, and gb3 specified by the event IDs ID2, ID5, and ID8 are considered to include the taken pictures P of the identical event since the picture-taking timing of the taken picture P included in the group gb1 and the like are May in common and the picture-taking place and the event name are identical, "athletic meeting". For this reason, the groups gb1, gb2, and gb3 become a group of taken picture Ev2 including the taken pictures P of the identical event.

The groups gc1, gc2, and gc3 specified by the event IDs ID3, ID6, and ID9 are considered to include the taken pictures P of the identical event since the picture-taking timing of the taken pictures P included in the group gc1 and the like is July in common and the event name is identical, "school excursion". For this reason, the groups gc1, gc2, and gc3 become a group of taken picture Ev3 including the taken pictures P of the identical event.

The groups gd1, gd2, and gd3 specified by the event IDs ID4, ID7, and ID10 are considered to include the taken pictures P of the identical event since the picture-taking timing of the taken pictures P included in the group gd1 and the like is September in common and the picture-taking place and the event name are identical, "school festival". For this reason, the groups gd1, gd2, and gd3 become a group of taken picture Ev4 including the taken pictures P of the identical event.

The group ge1 specified by the event ID ID11 becomes a single group of taken picture Ev5 since there is no taken picture P at the identical picture-taking timing in other groups and there is no taken picture with an event name identical to the event name. Similarly, the group gf1 specified by the event ID ID12 becomes a single group of taken picture Ev6 since there is no taken picture P at the identical picture-taking timing in other groups and there is no taken picture P with an event name identical to the event name.

In this way, the multiple taken pictures are grouped by identical event, and a plurality of groups of taken picture Ev1 to Ev6 are generated. Although the multiple taken pictures are grouped into a plurality of groups of taken picture while regarding the taken pictures at the identical timing and the identical picture-taking place and with the identical event name as the taken pictures of the identical event, the taken pictures at the identical timing may be regarded as the taken pictures of the identical event, the taken pictures at the identical timing and the identical picture-taking place may be regarded as the taken pictures of the identical event, or the taken pictures at the identical timing and with the identical event name may be regarded as the taken pictures of the identical event.

Data indicating a plurality of groups of taken picture Ev1 to Ev6 generated by specifying the identical event in the identical event specification device 4 of FIG. 1 and picture data representing the taken pictures P divided by event in the event division device 3 are given to an event arrangement device 5.

Figure 5:
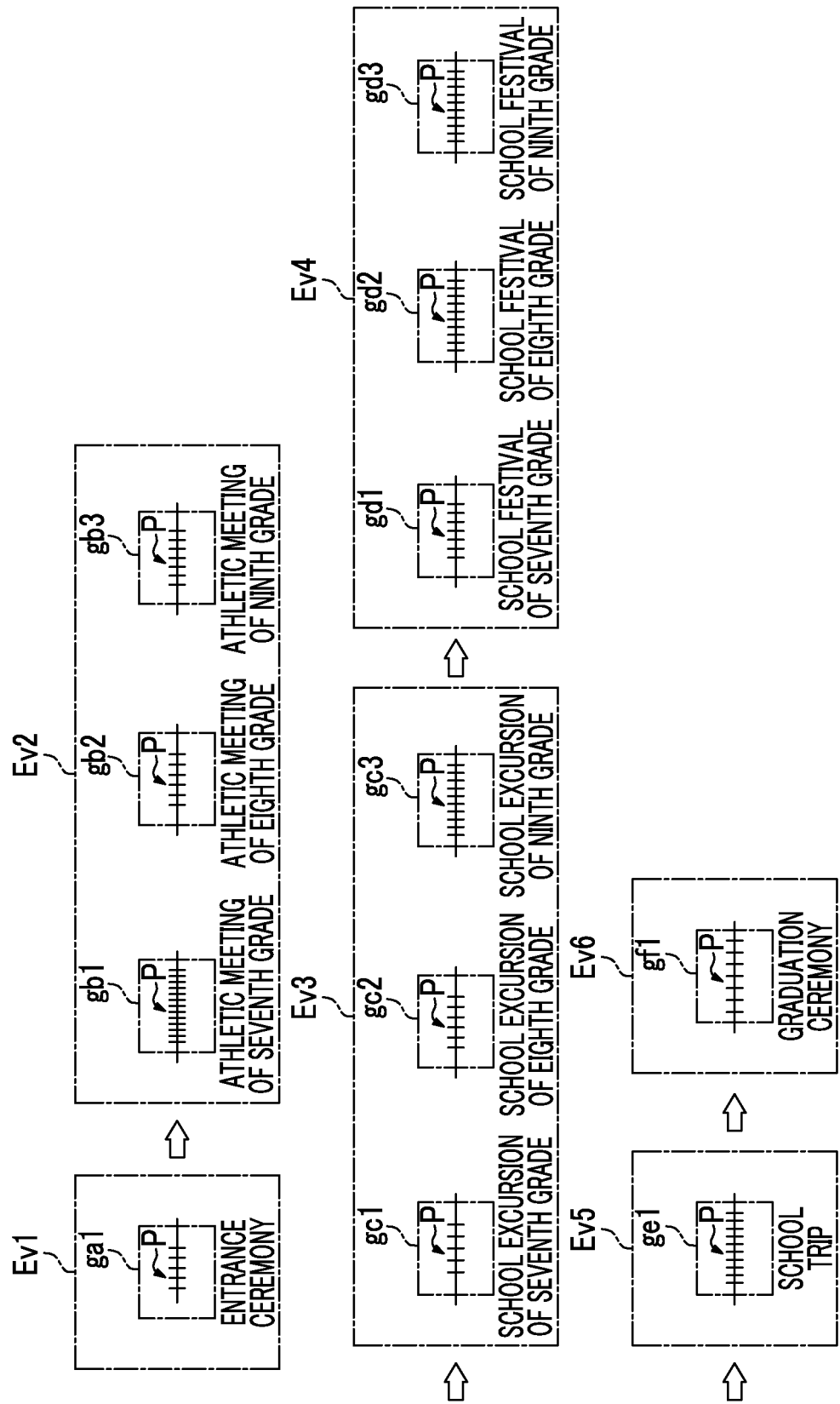
FIG. 5 shows an arrangement order of taken pictures.

The event arrangement device 5 determines the order of the events represented by the taken pictures P in the electronic album. In this example, the order of the events is determined in the order in which the taken pictures P included in a plurality of groups of taken picture Ev1 to Ev6 divided by identical event are taken. As will be understood from FIG. 3, since the old picture-taking dates of the taken pictures P included in the respective picture-taking groups of the groups of taken picture Ev1, Ev2, Ev3, Ev4, Ev5, and Ev6 are April, 2007, May, 2007, July, 2007, September, 2007, October, 2009, and March, 2010, as shown in FIG. 5, the arrangement (order) of the events is determined in the order of the groups of taken picture Ev1 to Ev6.

In FIG. 1, if the arrangement of the events is determined in the event arrangement device 5, event icons indicating the arrangement of the events are displayed on a display screen of a display device 10 under the control of a display control device 9.

Figure 6:
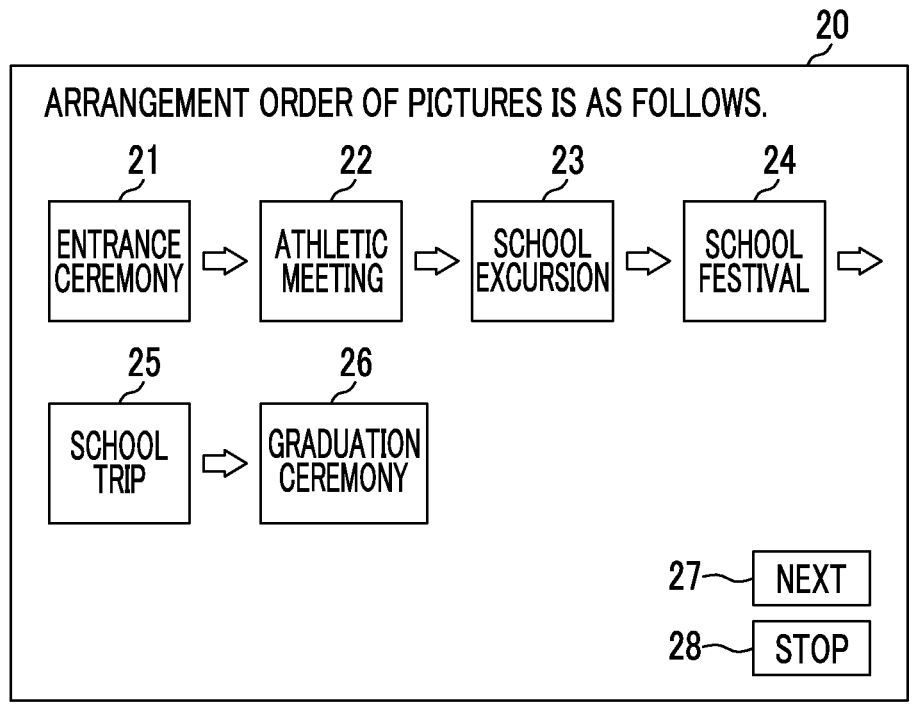
FIG. 6 is an example of a display screen.

FIG. 6 is an example of event icons 21 to 26 which are displayed on a display screen 20 of the display device 10.

On the display screen 20, an event icon 21 of an entrance ceremony, an event icon 22 of an athletic meeting, an event icon 23 of a school excursion, an event icon 24 of a school festival, an event icon 25 of a school trip, and an event icon 26 of an graduation ceremony are displayed. The taken pictures P of the event of the entrance ceremony, the event of the athletic meeting, the event of the school excursion, the event of the school festival, the event of the school trip, and the event of the graduation ceremony specified by the event icons 21 to 26 are consecutively arranged in an electronic album by identical event in the picture-taking order.

The display screen 20 also includes an area 27 where a character "NEXT" which is touched to advance the next process is displayed and an area 28 where a character "STOP" which is touched to stop the process is displayed. It is needless to say that a touch panel is formed on the display screen 20.

The arrangement of the events can be changed in the event arrangement change device 6 shown in FIG. 1.

Figure 7:
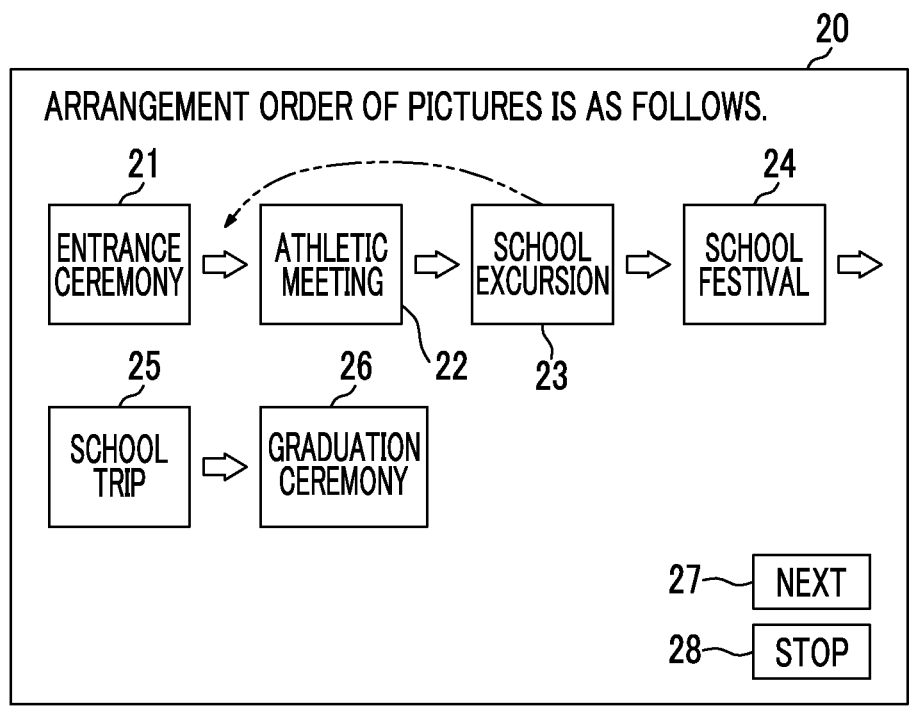
FIG. 7 is an example of a display screen.
Figure 8:
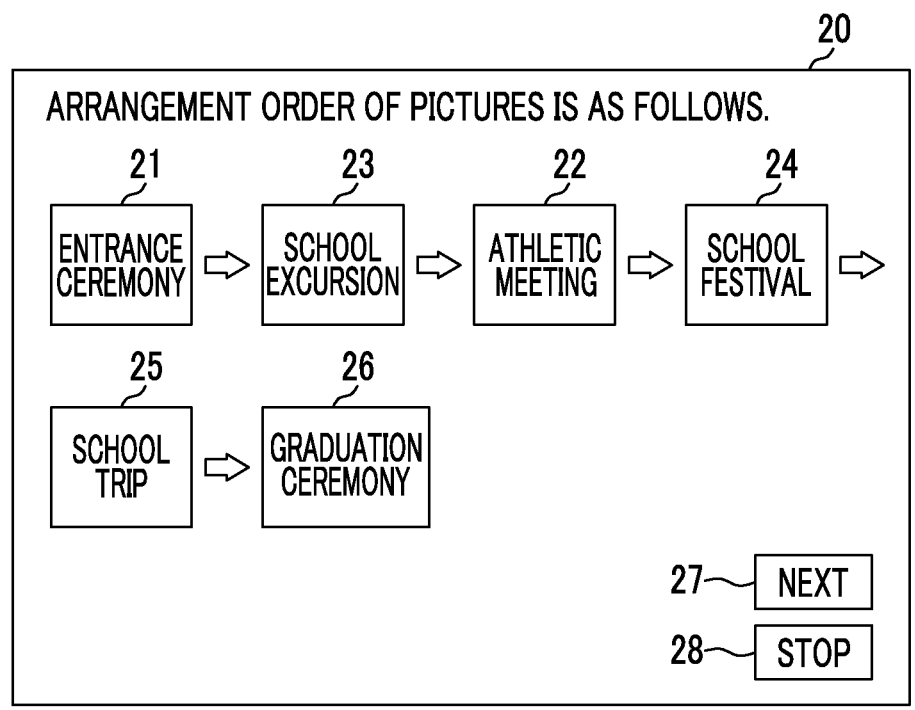
FIG. 8 is an example of a display screen.

In changing the arrangement of the events, as shown in FIG. 7, the position of the event icon indicating the event to be changed in the arrangement may be changed. For example, when changing the arrangement of the events such that the event of the school excursion is arranged before the event of the athletic meeting, the event icon 23 of the school excursion is dragged and dropped as indicated by a dot-chain line so as to be arranged before the event icon 22 of the athletic meeting. Then, as shown in FIG. 8, the icons 22 and 23 are replaced such that the event of the school excursion is arranged before the event of the athletic meeting. In this way, the event icon is operated to change the arrangement of the events, whereby the arrangement order of the taken pictures of the changed event is changed. Accordingly, while the taken pictures are arranged in the electronic album by identical event in the order of the taken pictures of the entrance ceremony, the taken pictures of the athletic meeting, and the taken pictures of the school excursion before changing the event arrangement, the taken pictures are arranged in the electronic album by identical event in the order of the taken pictures of the entrance ceremony, the taken pictures of the school excursion, and the taken pictures of the athletic meeting after changing the event arrangement.

Data indicating the event arrangement determined in the event arrangement device 5 in FIG. 1 is also given to the picture selection device 7.

As shown in FIGS. 4 and 5, the event picture groups ga1, gb1, or the like in which the taken pictures P are grouped on the basis of the picture-taking date is included in each of the groups of taken picture Ev1 to Ev6. Since multiple taken pictures P are included in the group ga1, all taken pictures P cannot be used in the electronic album. For this reason, a number of taken pictures which fit to an identical page or a spread page are selected from each of a plurality of groups of taken picture Ev1 to Ev6. Preferably, like the group of taken picture Ev2 or the like, when a plurality of event picture groups gb1, gb2, and gb3 are included, at least one taken picture is selected from each of all groups gb1, gb2, and gb3. A taken picture, such as a large main object, a taken picture with a main object at the center thereof, or a taken picture having appropriate brightness, is selected.

FIG. 9 is an example of a taken picture selected for each group of taken picture (event).

The event of the entrance ceremony is the group of taken picture Ev1. Since only one event picture group ga1 is included in the group of taken picture Ev1, two taken pictures P11 and P12 are selected from among the multiple taken pictures P included in the group ga1.

The event of the athletic meeting is the group of taken picture Ev2. Since the three event picture groups gb1, gb2, and gb3 are included in the group of taken picture Ev2, at least one picture is selected from each of the event picture groups gb1, gb2, and gb3. For example, taken pictures P21 and P22 are selected from the event picture group gb1, a taken picture P23 is selected from the event picture group gb2, and a taken picture P24 is selected from the event picture group gb3.

In regard to other events, similarly, when a plurality of event picture groups are included in the group of taken picture corresponding to each event, at least one picture is selected from each of all event picture groups. In this way, the taken pictures P31 to P34 are selected as a picture corresponding to the event of the school excursion, the taken pictures P41 to P44 are selected as a picture corresponding to the event of the school festival, the taken pictures P51 to P54 are selected as a picture corresponding to the event of the school trip, and the taken pictures P61 and P62 are selected as a picture corresponding to the event of the graduation ceremony.

In FIG. 1, if the taken picture is selected by the picture selection device 7, picture data representing the selected taken picture is given to a layout device 8. The arranged taken pictures are changed by a picture arrangement change device 12. In this case, data representing a picture changed in the arrangement is given to the layout device 8. When the event arrangement is changed by the event arrangement change device 6, information regarding the change in the event arrangement is given to the layout device 8, when the event arrangement is not changed, information output from the event arrangement device 5 is given to the layout device 8.

In the layout device 8, the selected taken pictures are laid out in the electronic album. Then, the electronic album is displayed on the display screen of the display device 10 under the control of the display control device 9. An album with the electronic album printed thereon is output from an album output device 11.

FIGS. 10 to 15 are an example of the display screen 20 of the display device 10.

On the display screen 20, an electronic album display area 30 is formed over the substantially entire display screen 20. The electronic album display area 30 includes a left page area 30A and a right page area 30B. An even-numbered page of the electronic album is displayed in the left page area 30A, and an odd-numbered page of the electronic album is displayed in the right page area 30B.

The first page of the electronic album is displayed in the right page area 30B of the electronic album display area 30, and the taken pictures P11 and P12 of the event of the entrance ceremony are displayed on the first page.

On the right side of the electronic album display area 30, an area 31 where a character "NEXT PAGE" is displayed is formed. If the area 31 is touched, the next page of the electronic album displayed in the electronic album display area 30 is displayed in the electronic album display area 30. Below the area 31, an area 32 where a character "PREVIOUS PAGE" is displayed is formed. If the area 32 is touched, the previous page of the electronic album displayed in the electronic album display area 30 is displayed in the electronic album display area 30. Below the area 32, an area 33 where a character "STOP" is displayed is formed. If the area 33 is touched, the browsing of the electronic album is stopped.

Below the electronic album display area 30, a taken picture display area 34 is formed. In the taken picture display area 34, pictures 36 other than the taken pictures selected in the above-described manner are displayed. In the upper portion of the taken picture display area 34, a scroll bar 35 is formed. The taken pictures which are not displayed in the taken picture display area 34 are displayed in the taken picture display area 34 by scrolling the scroll bar 35.

On the right side of the taken picture display area 34, an area 37 where a character "DELETE" is displayed is formed. After the taken picture displayed in the electronic album display area 30 is selected (touched), if the area 37 is touched, the selected taken picture is deleted from the electronic album. If the taken picture displayed in the taken picture display area 34 is dragged and dropped at the position where the taken picture is deleted, the taken picture is newly arranged in the electronic album. With this, the user can change the arrangement of a desired taken picture.

Figure 11:
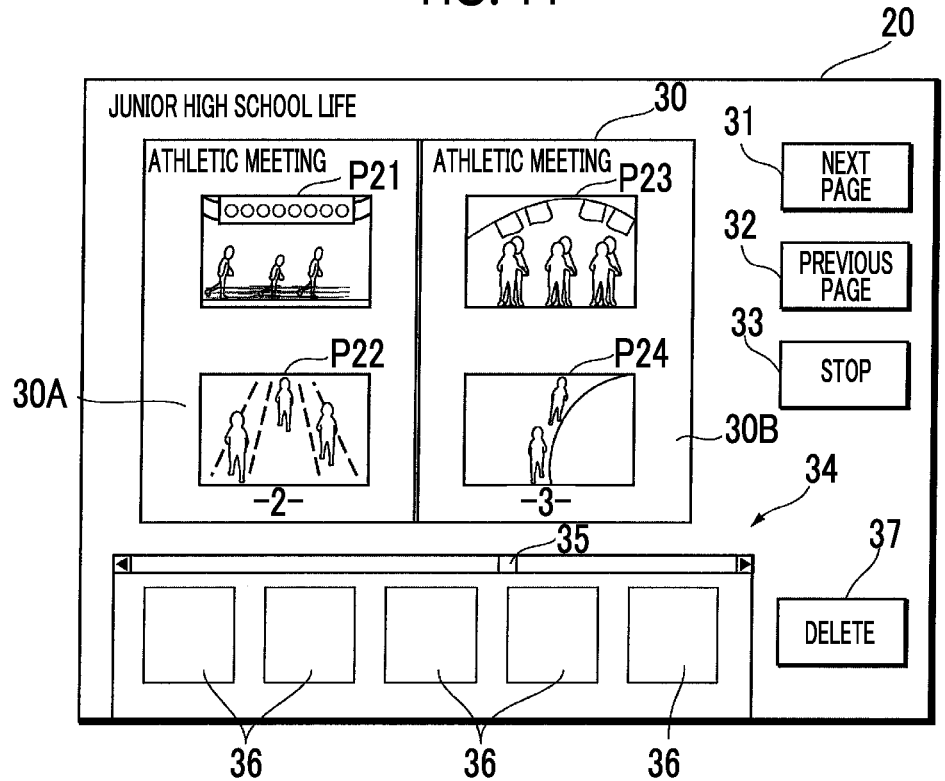
FIG. 11 is an example of a display screen.

FIG. 11 shows the second page and the third page of the electronic album.

The second page of the electronic album is displayed in the left page area 30A, and the taken pictures P21 and P22 of the event of the athletic meeting are displayed on the second page. The third page of the electronic album is displayed in the right page area 30B, and the taken pictures P23 and P24 of the event of the athletic meeting are displayed on the third page.

Figure 12:
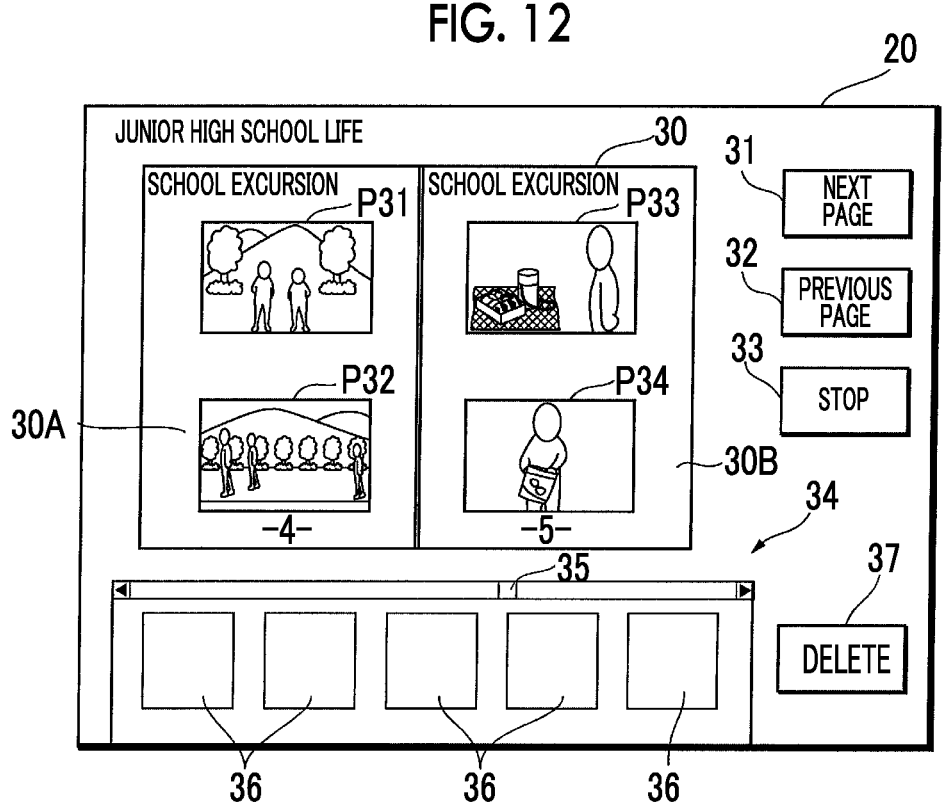
FIG. 12 is an example of a display screen.

FIG. 12 shows the fourth page and the fifth page of the electronic album.

The fourth page of the electronic album is displayed in the left page area 30A, and the taken pictures P31 and P32 of the event of the school excursion are displayed on the fourth page. The fifth page of the electronic album is displayed in the right page area 30B, and the taken pictures P33 and P34 of the event of the school excursion are displayed on the fifth page.

Figure 13:
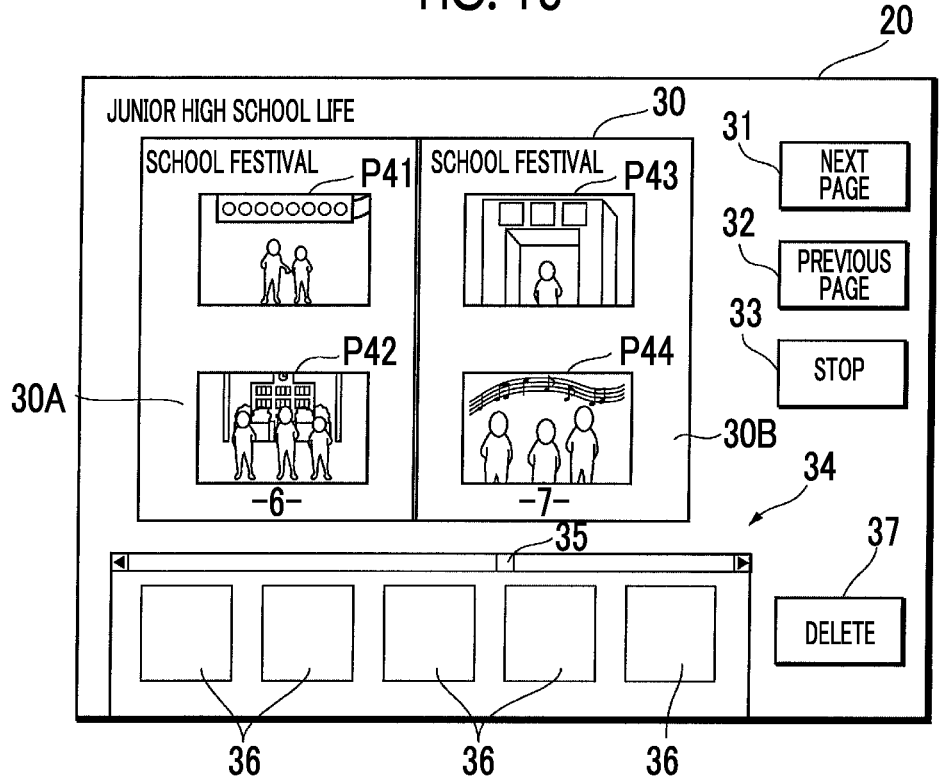
FIG. 13 is an example of a display screen.

FIG. 13 shows the sixth page and the seventh page of the electronic album.

The sixth page of the electronic album is displayed in the left page area 30A, and the taken pictures P41 and P42 of the event of the school festival are displayed on the sixth page. The seventh page of the electronic album is displayed in the right page area 30B, the taken pictures P43 and P44 of the event of the school festival are displayed on the seventh page.

Figure 14:
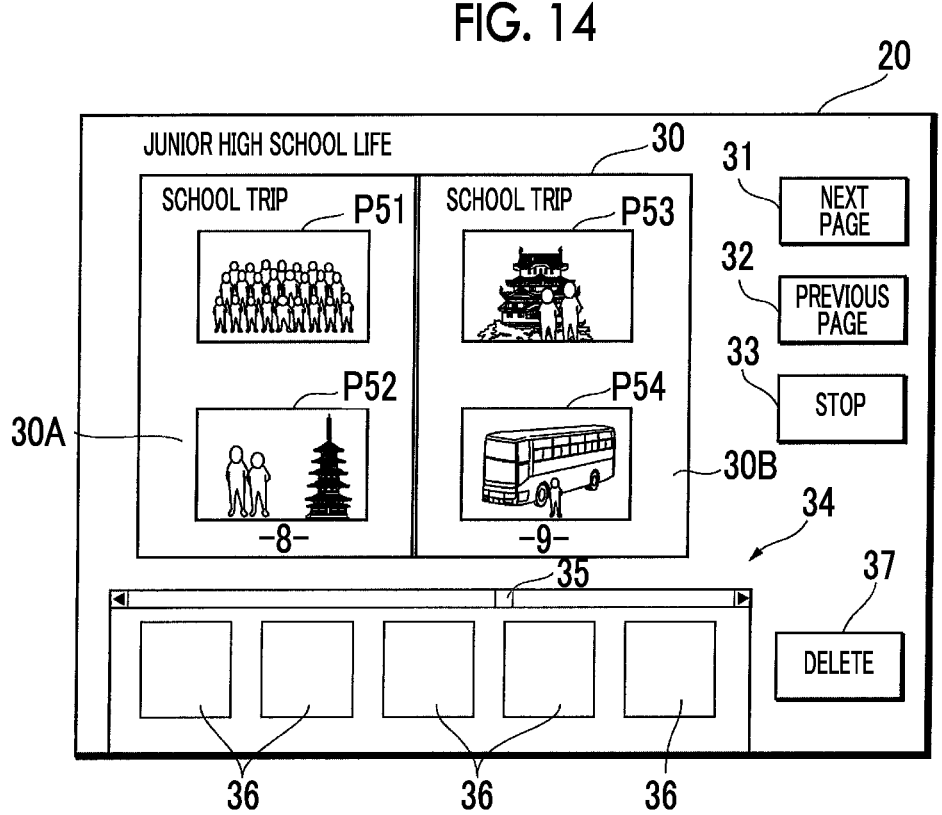
FIG. 14 is an example of a display screen.

FIG. 14 shows the eighth page and the ninth page of the electronic album.

The eighth page of the electronic album is displayed in the left page area 30A, and the taken pictures P51 and P52 of the event of the school trip are displayed on the eighth page. The ninth page of the electronic album is displayed in the right page area 30B, and the taken pictures P53 and P54 of the event of the school excursion are displayed on the ninth page.

Figure 15:
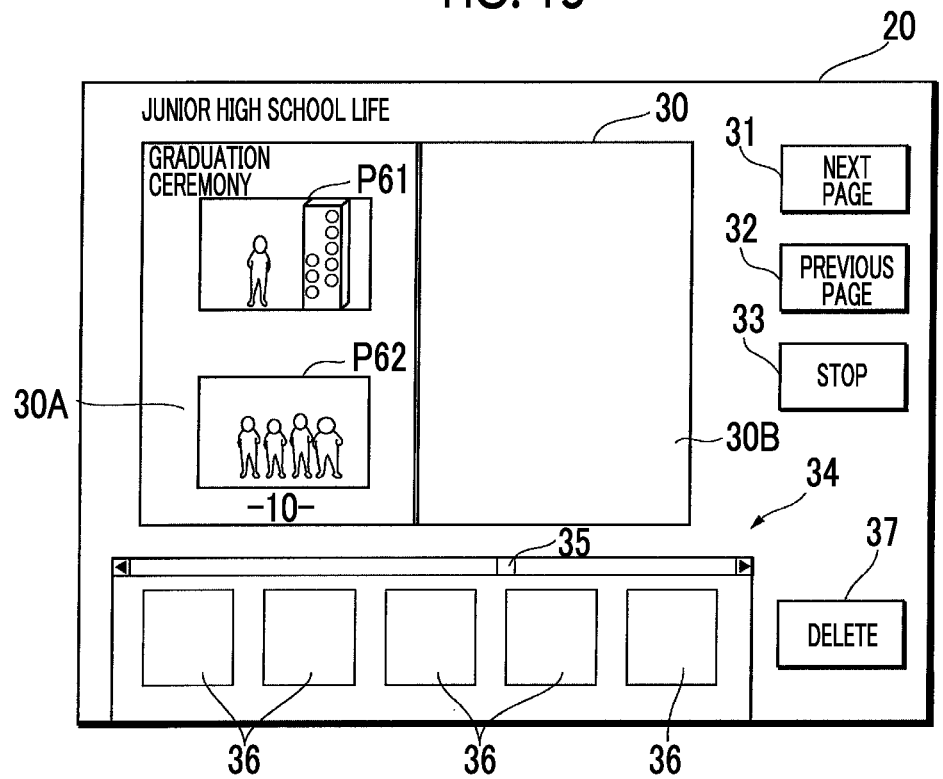
FIG. 15 is an example of a display screen.

FIG. 15 shows the tenth page of the electronic album.

The tenth page of the electronic album is displayed in the left page area 30A, and the taken pictures P61 and P62 of the event of the graduation ceremony are displayed on the tenth page.

Since the electronic album is generated such that the taken pictures are arranged in a time-series order of the event timing of the event represented by the taken pictures, and the taken pictures of the identical events are consecutively arranged on the spread page or the identical page, if the object is a person, and the status of growth of the person is understood only by viewing the page. Even if the object is not a person, the status of a change of the object is understood.

FIGS. 16 to 25 show a modification example.

In the above-described example, although the electronic album is generated from the taken pictures while the main object is in the junior high school, in a modification example described below, an electronic album is generated from taken pictures while a main object is in a junior high school to a senior high school.

Figure 16:
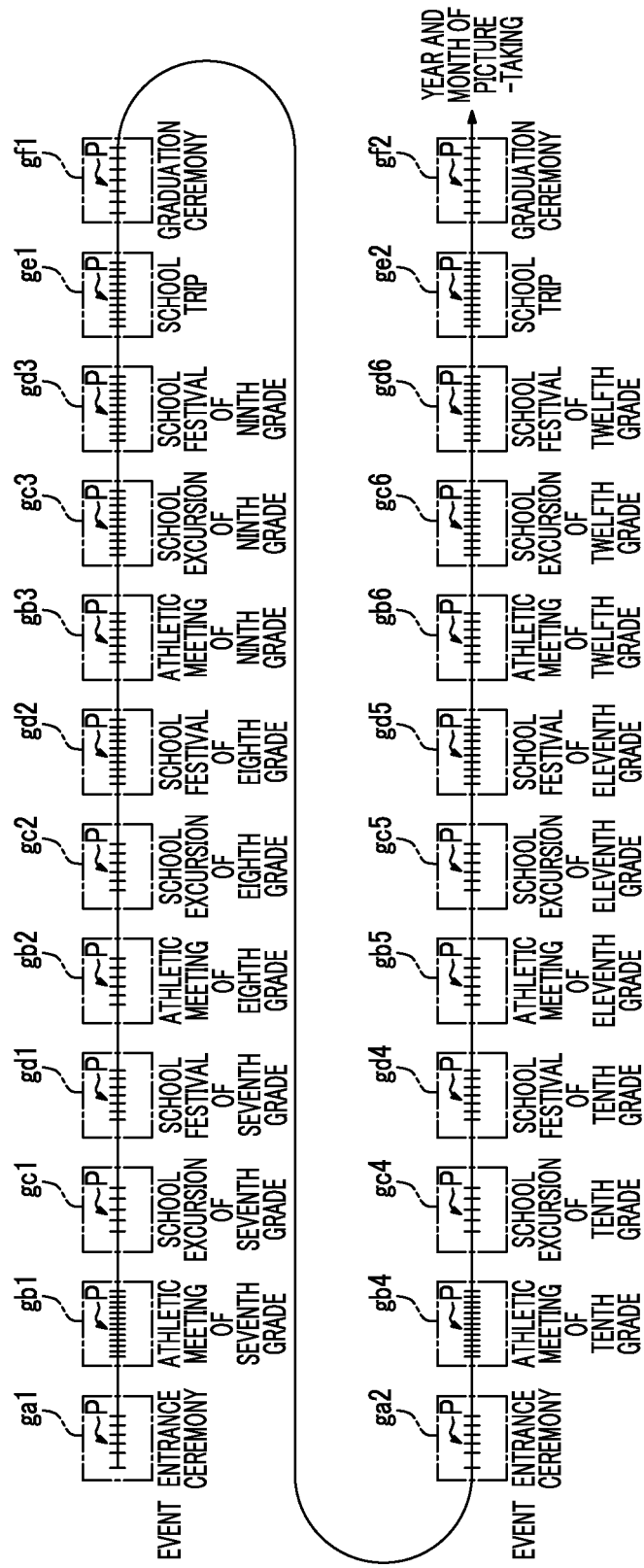
FIG. 16 shows a status in which taken pictures are divided by event.

FIG. 16 corresponds to FIG. 2, and shows a status in which multiple taken pictures are grouped by event and an event picture group ga1 and the like are generated.

As described above, similarly to a case where the taken pictures while the main object is in the junior high school are divided by event and the event picture group ga1 is generated, the taken pictures while the main object is in the senior high school are divided by event and event picture groups ga2, gb4, gc4, gd4, gb5, gc5, gd5, gb6, gc6, gd6, ge2, and gf2 are generated.

FIG. 17 corresponds to FIG. 3, and is an example of an event information table including the event picture group ga2 and the like generated as shown in FIG. 16.

The taken pictures while the main object is in the senior high school are divided into event picture groups by event, event information of picture-taking date, a picture-taking place, and an event name is obtained for each event ID corresponding to each event picture group.

Figure 18:
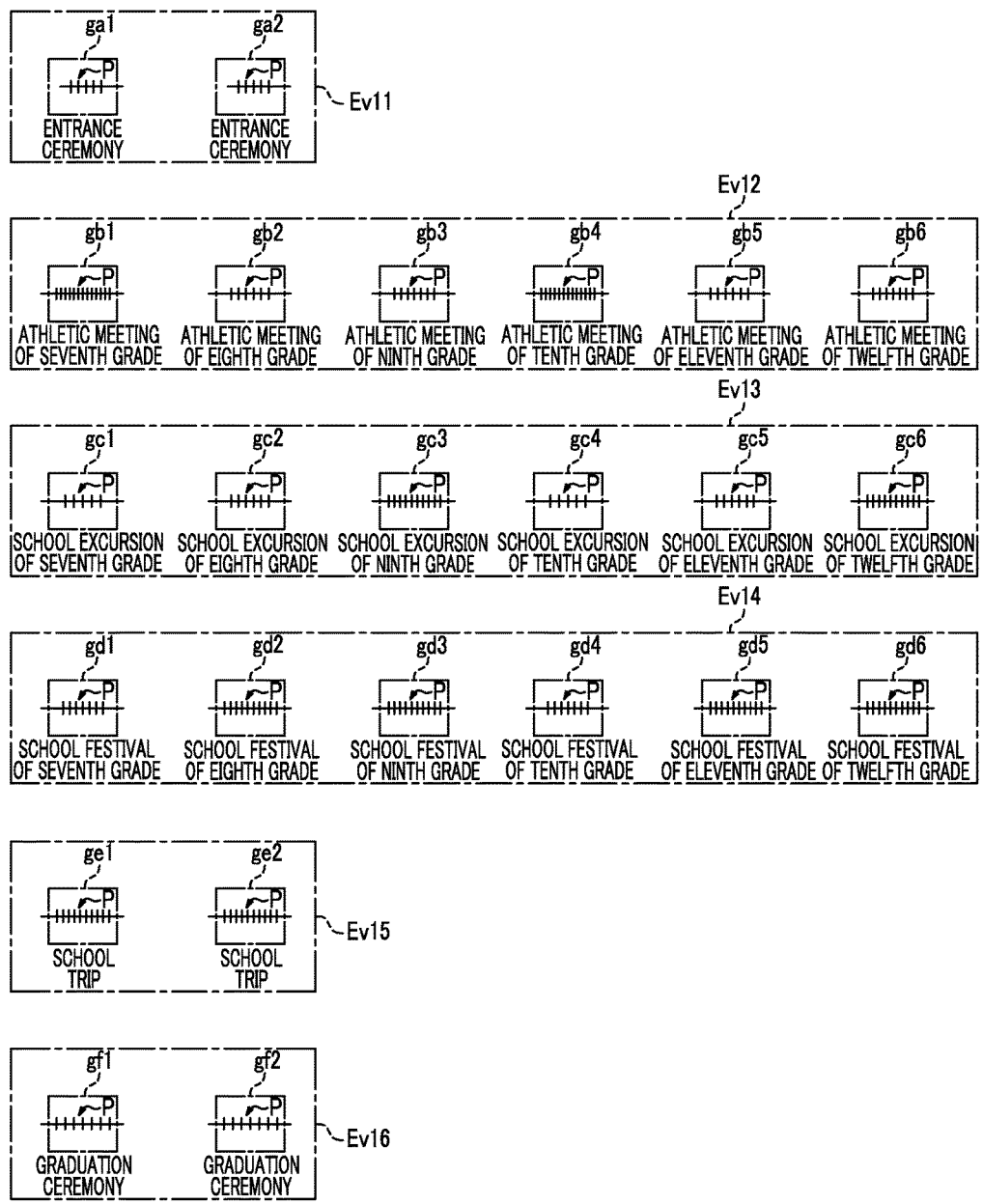
FIG. 18 shows a status in which taken pictures are divided by identical event.

FIG. 18 corresponds to FIG. 4, and is an example of groups of taken picture which are generated to be in identical groups for identical events.

A group of taken picture Ev11 is for an event of an entrance ceremony. An event picture group ga1 of an entrance ceremony of a junior high school and an event picture group ga2 of an entrance ceremony of a senior high school are included.

A group of taken picture Ev12 is for an event of an athletic meeting. Event picture groups gb1 to gb6 of the athletic meeting of the seventh grade to the athletic meeting of the twelfth grade are included.

A group of taken picture Ev13 is for an event of a school excursion. Event picture groups gc1 to gc6 of the school excursion of the seventh grade to the school excursion of the twelfth grade are included.

A group of taken picture Ev14 is for an event of a school festival. Event picture groups gd1 to gd6 of the school excursion of the seventh grade to the school excursion of the twelfth grade are included.

A group of taken picture Ev15 is for an event of a school trip. Event picture groups ge1 and ge2 of the school trip of the junior high school and the school trip of the senior high school are included.

A group of taken picture Ev16 is for an event of a graduation ceremony. Event picture groups gf1 and gf2 of the graduation ceremony of the junior high school and the graduation ceremony of the senior high school are included.

FIG. 19 corresponds to FIG. 9, and is an example of taken pictures selected for each group of taken picture.

The event of the entrance ceremony is the group of taken picture Ev11. The event picture group ga1 of the entrance ceremony of the junior high school and the event picture group ga2 are included in the group of taken picture Ev11. A taken picture P11 is selected from the event picture group ga1, and a taken picture P12 is selected from the event picture group ga2.

The event of the athletic meeting is the group of taken picture Ev12. Since the six event picture groups gb1 to gb6 are included in the group of taken picture Ev12, at least one picture is selected from each of the event picture groups gb1 to gb6. For example, taken pictures P21 to P23 and P201 to P203 are selected from the event picture groups gb1 to gb6.

In regard to other events, similarly, when a plurality of event picture groups are included in the group of taken picture corresponding to each event, at least one picture is selected from each of all picture groups. In this way, taken pictures P31 to P33 and P301 to P303 are selected as a picture corresponding to the event of the school excursion, taken pictures P41 to P43 and P401 to P403 are selected as an picture corresponding to the event of the school festival, taken pictures P51 to P53 and P501 to P503 are selected as a picture corresponding to the event of the school trip, and taken pictures P61 and P601 are selected as a picture corresponding to the event of the graduation ceremony.

Figure 10:
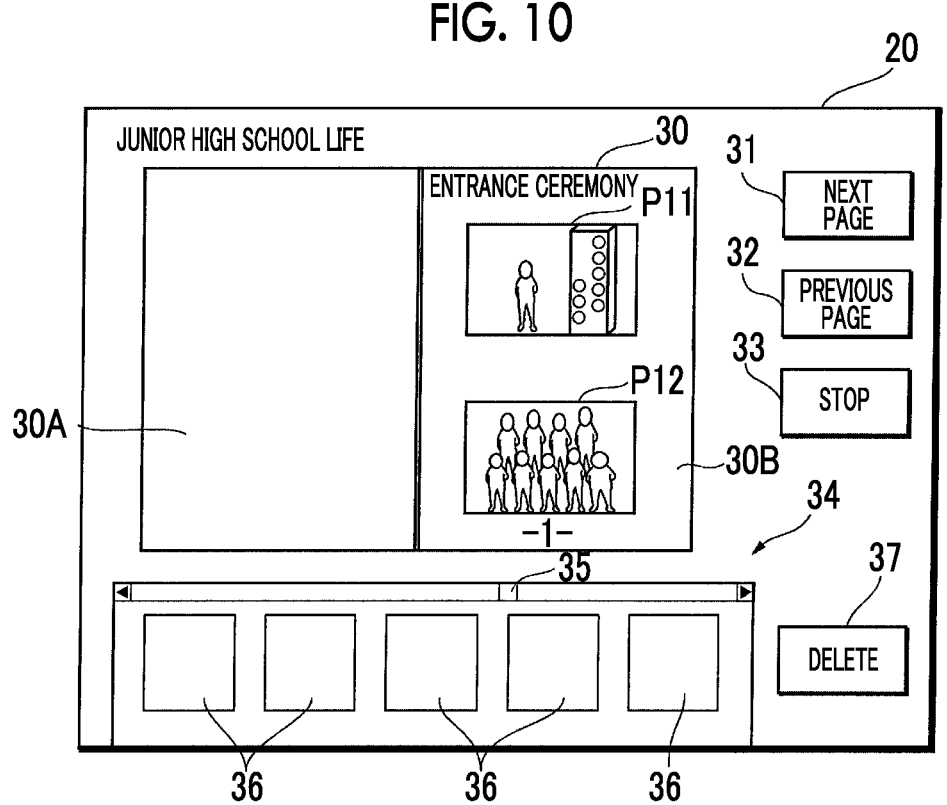
FIG. 10 is an example of a display screen.

FIGS. 20 to 25 correspond to FIGS. 10 to 15, and are an example of the display screen 20. In these drawings, the same things as those shown in FIG. 10 are represented by the same reference numerals, and description thereof will not be repeated.

Figure 20:
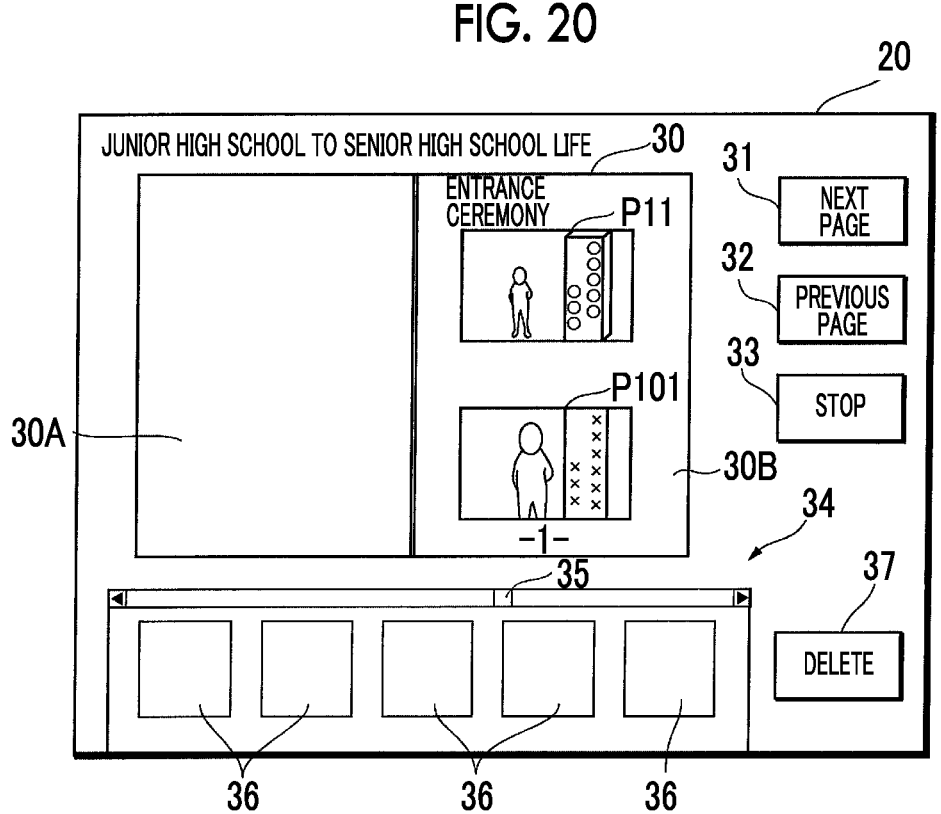
FIG. 20 is an example of a display screen.

Referring to FIG. 20, the taken picture P11 of the entrance ceremony of the junior high school and the taken picture P101 of the entrance ceremony of the senior high school are displayed in the right page area 30B. Since the taken picture P11 of the entrance ceremony of the junior high school and the taken picture P101 of the entrance ceremony of the senior high school are displayed on the same page, the status of a change of the object is easily understood.

Figure 21:
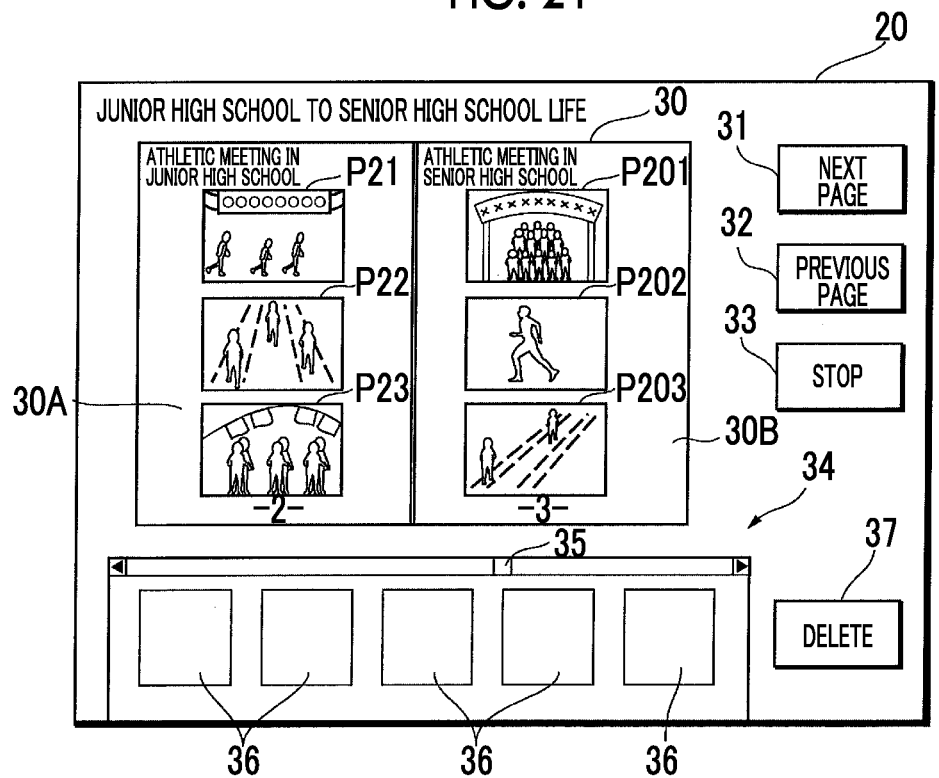
FIG. 21 is an example of a display screen.

Referring to FIG. 21, the taken pictures P21 to P23 of the athletic meetings of the seventh grade to the ninth grade are displayed in the left page area 30A, and the taken pictures P201 to P203 of the athletic meetings of the tenth grade to the twelfth grade are displayed in the right page area 30B.

Figure 22:
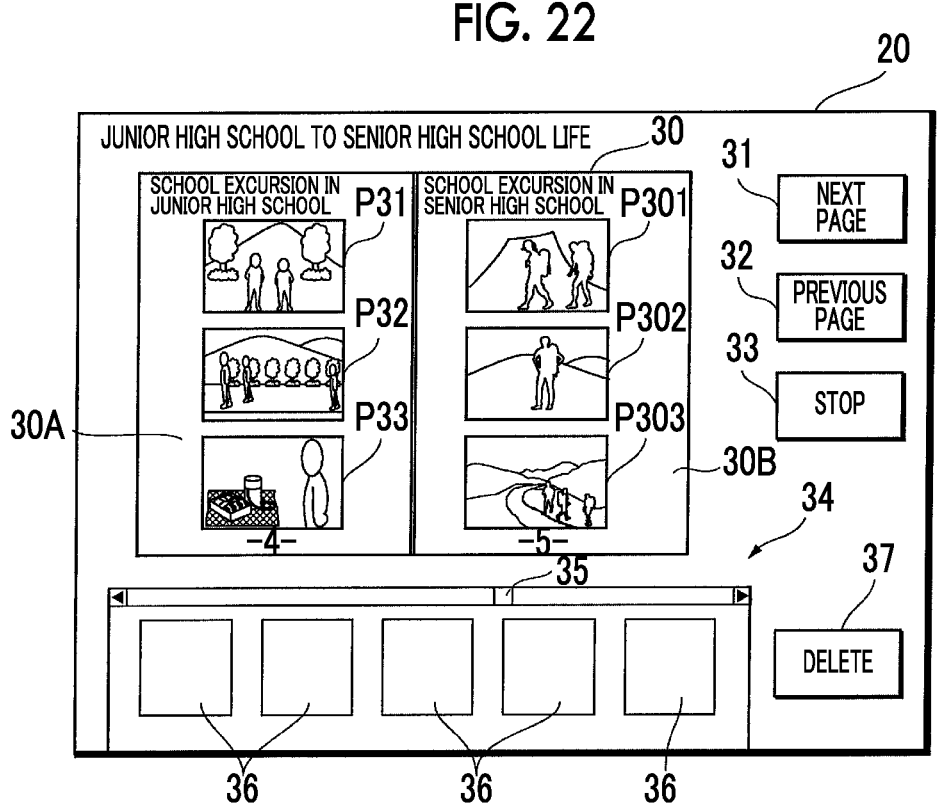
FIG. 22 is an example of a display screen.

Referring to FIG. 22, the taken pictures P31 to P33 of the school excursions of the seventh grade to the ninth grade are displayed in the left page area 30A, and the taken pictures P301 to P303 of the school excursions of the tenth grade and the twelfth grade are displayed in the right page area 30B.

Figure 23:
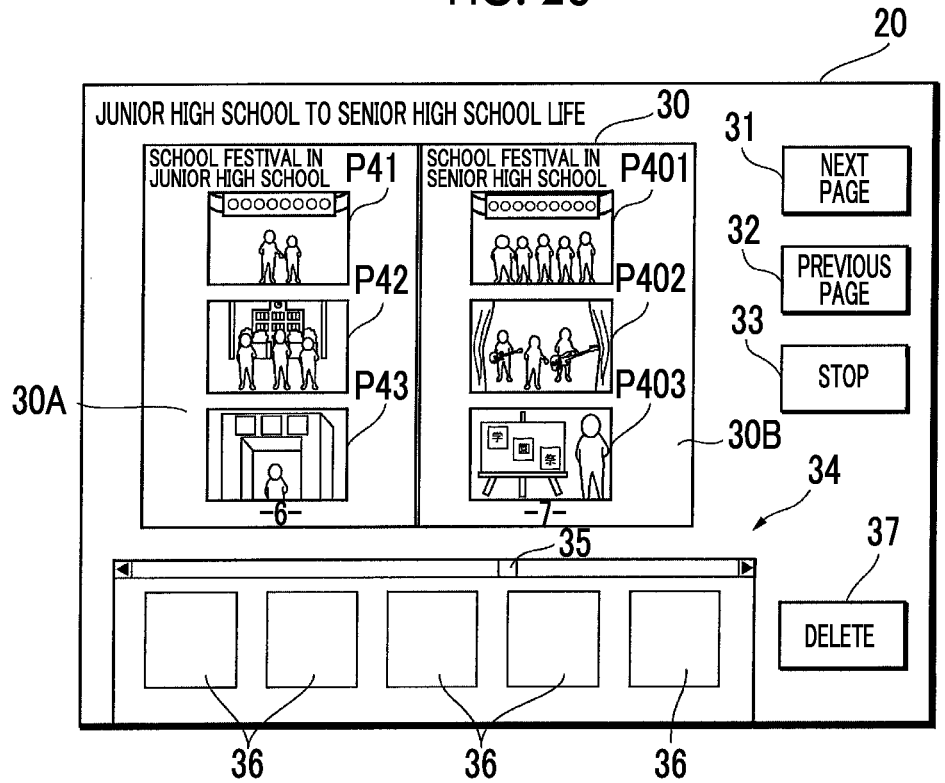
FIG. 23 is an example of a display screen.

Referring to FIG. 23, the taken pictures P41 to P43 of the school festivals of the seventh grade to the ninth grade are displayed in the left page area 30A, and the taken pictures P401 to P403 of the school festivals of the tenth grade to the twelfth grade are displayed in the right page area 30B.

Figure 24:
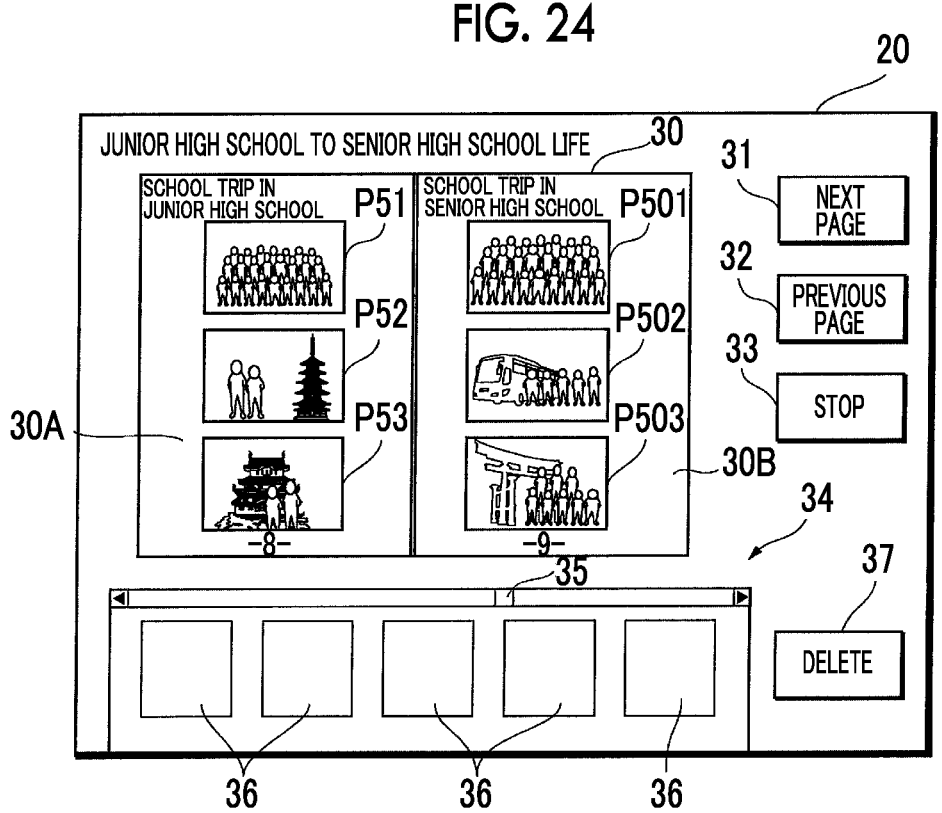
FIG. 24 is an example of a display screen.

Referring to FIG. 24, the taken pictures P51 and P52 of the school trip of the junior high school are displayed in the left page area 30A, and the taken pictures P501 and P502 of the school trip of the senior high school are displayed in the right page area 30B.

Figure 25:
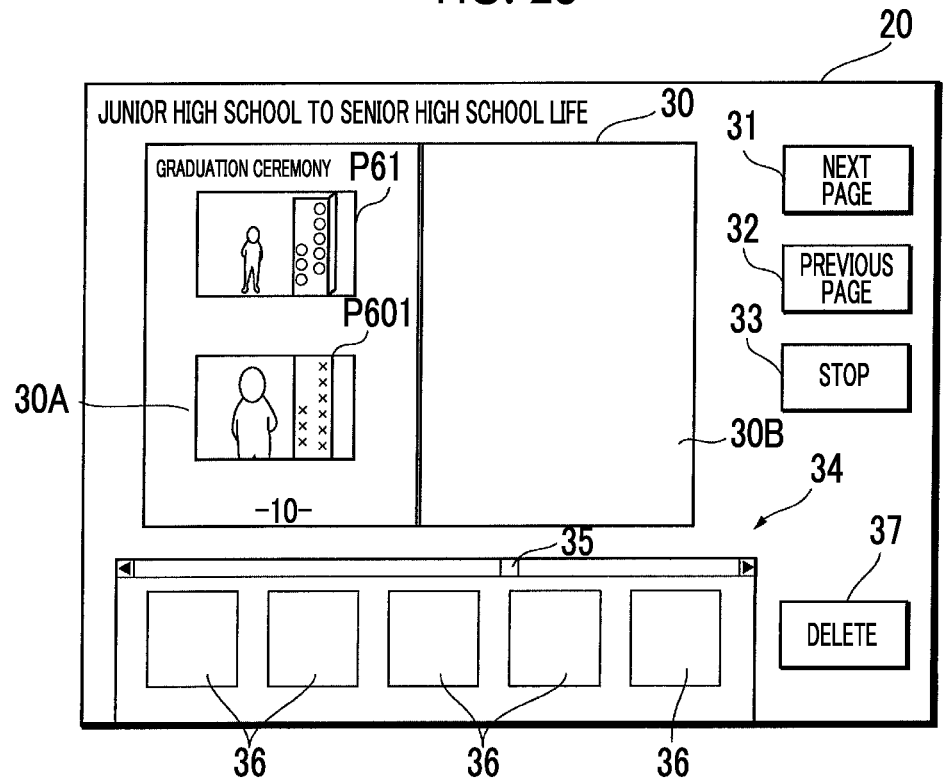
FIG. 25 is an example of a display screen.

Referring to FIG. 25, the taken picture P61 of the graduation ceremony of the junior high school and the taken picture P601 of the graduation ceremony of the senior high school are displayed in the left page area 30A.

As described above, since the taken pictures of the identical event are consecutively displayed on the identical page or the spread page (the identical page or the spread page may not be used), the status of a change of the object is easily understood.

Figure 26:
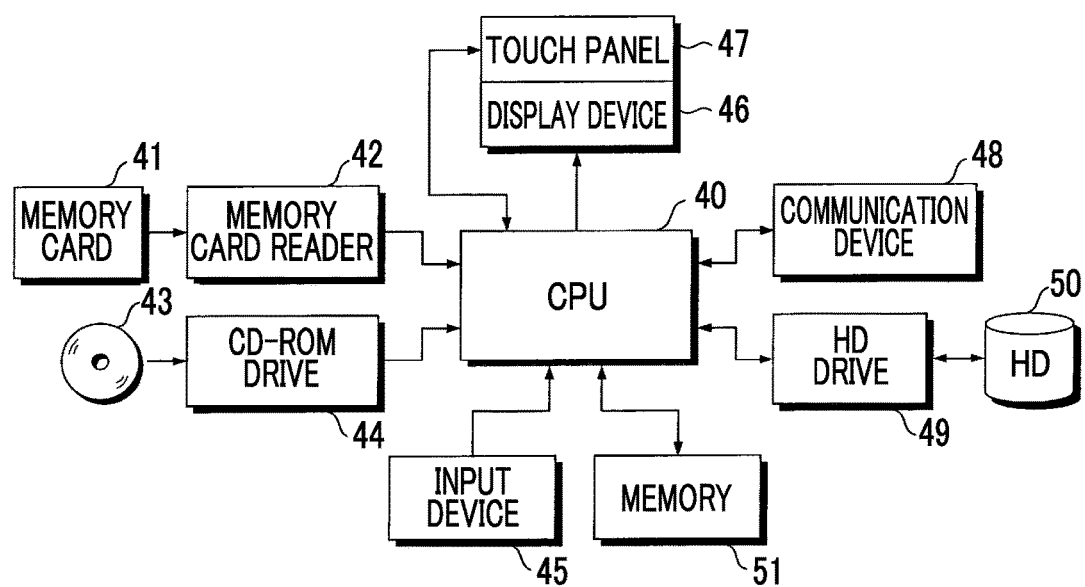
FIG. 26 is a block diagram showing the electrical configuration of a personal computer.
Figure 27:
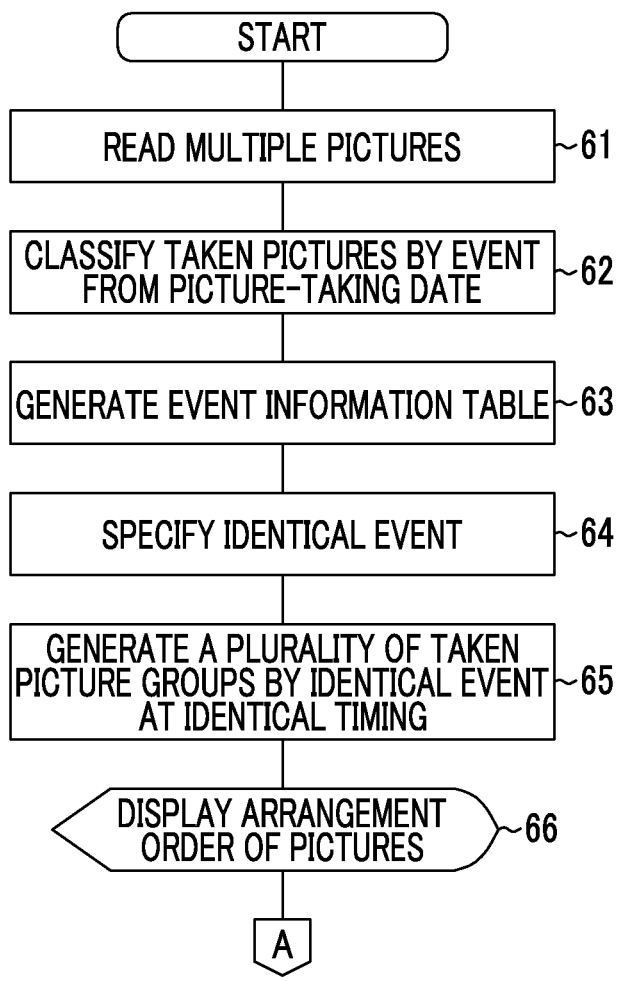
FIG. 27 is a flowchart showing a processing procedure of the personal computer.
Figure 28:
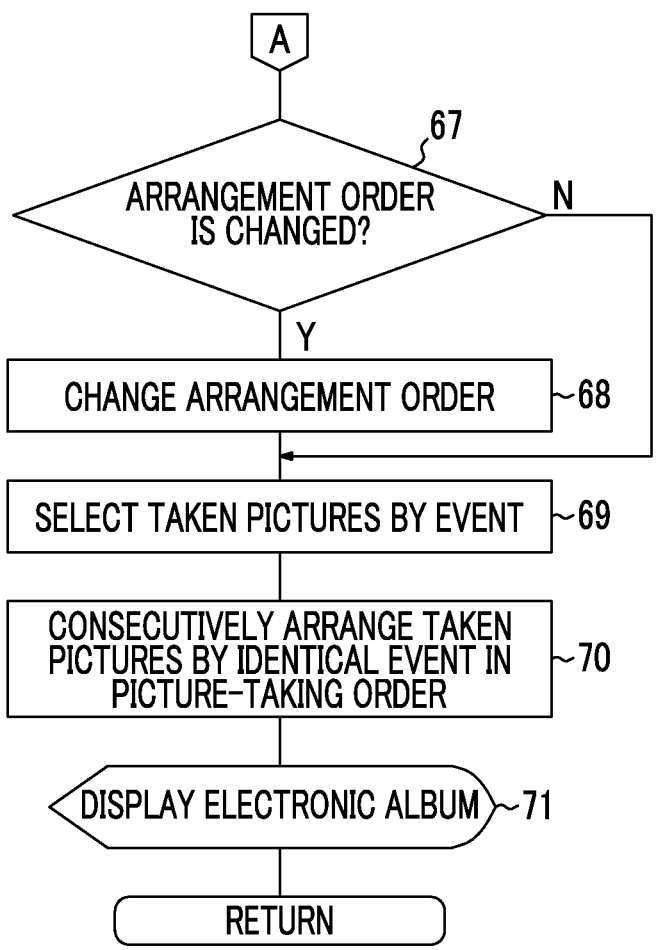
FIG. 28 is a flowchart showing a processing procedure of the personal computer.

FIGS. 26 to 28 show another example.

FIG. 26 is a block diagram showing the electrical configuration of a personal computer.

Even if the personal computer is used, the same process described above can be realized.

The overall operation of the personal computer is integrally controlled by a CPU 40.

A compact disk (CD) 43 stores a program which controls the above-described operation. If the CD 43 is loaded on a CD-ROM drive 44, the program stored in the CD 43 is read, and the read program is installed on the personal computer. However, it is needless to say that the program may be downloaded through a network.

The personal computer includes an input device 45, such as a keyboard and a mouse, and a command from the input device 45 is input to the CPU 40.

A memory card 41 stores picture files representing multiple taken pictures as described above. The picture files representing the multiple taken pictures stored in the memory card 41 are read by a memory card reader 42, and are written to a hard disk 50 by a hard disk drive 49.

The personal computer includes a display device 46, and a touch panel 47 is formed on the display screen of the display device 46. Furthermore, the personal computer includes a memory 51 which temporarily stores data and the like. In addition, the personal computer includes a communication device 48.

FIGS. 27 and 28 are flowcharts showing a processing procedure for generating the above-described electronic album using the personal computer.

The multiple picture files representing the multiple taken pictures stored in the memory card 41 are read by the memory card reader 42 (Step 61). The read multiple picture files are given to and temporarily stored in the memory 51. The taken pictures are classified by event using the picture-taking date recorded in the header of each of the picture files as shown in FIG. 2, and are classified into event picture groups (Step 62). The event information table is generated as shown in FIG. 3 (Step 63).

The generated event information table is used to specify whether or not the events represented by the classified event picture groups are identical (Step 64). As shown in FIG. 4, a plurality of groups of taken picture are generated by identical event at the identical timing (Step 65).

The arrangement order of the taken pictures by event are displayed from a plurality of generated groups of taken picture as shown in FIG. 6 (Step 66). When the arrangement order of the taken pictures by event is changed as shown in FIG. 7 (in Step 67, YES), the arrangement order is changed according to an arrangement change command (Step 68). If there is no arrangement change command (in Step 67, NO), the processing of Step 68 is skipped.

Then, the taken pictures for use in the electronic album are selected from the groups of taken picture (Step 69). As shown in FIG. 6, when a plurality of picture groups are included in the groups of taken picture, at least one taken picture is selected from each of a plurality of picture groups. As shown in FIG. 9, the taken pictures are selected by event. The selected taken pictures are consecutively arranged by identical event in the picture-taking order as shown in FIGS. 10 to 15, and the electronic album with the taken pictures arranged in this manner is generated (Steps 70, 71).

Figure 29:
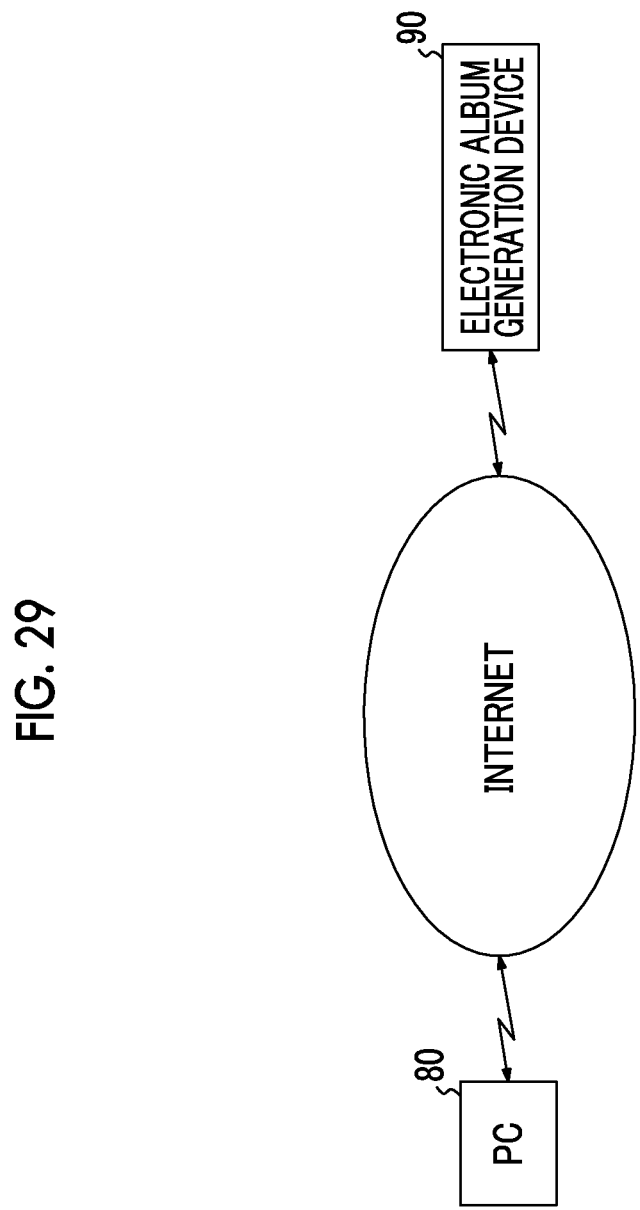
FIG. 29 shows a status in which the personal computer and the electronic album generation device are connected through the Internet.

FIG. 29 shows a status in which an electronic album generation device 90 is connected to the Internet.

A personal computer 80 of a user and the electronic album generation device 90 can perform communication with each other through the Internet. The electronic album generation device 90 may be provided with a communication device (picture file reception means) which can perform communication with the Internet, instead of the picture input device 2 in the configuration of FIG. 1.

Multiple picture files are transmitted from the personal computer 80 of the user to the electronic album generation device 90, and the multiple picture files are received by the electronic album generation device 90, whereby the above-described process is performed in the electronic album generation device 90.

What is claimed is:

1. An event-specific taken picture arrangement device comprising:
   a grouping device for reading a picture-taking date and a picture-taking place recorded in a picture-taking image file using a computer and for grouping multiple taken pictures by an identical event to generate a plurality of groups of taken pictures based on the read picture-taking date and the read picture-taking place;
   a taken picture arrangement device for consecutively arranging the taken pictures included in each of the plurality of groups of taken pictures generated by said grouping device in a picture-taking order by the identical event based on at least one of the picture-taking date and the picture-taking place read from the picture-taking image file by the computer;

a first arrangement change device for changing the arrangement of the taken pictures arranged in the picture-taking order by the identical event by said taken picture arrangement device in terms of events; and a first display control device for performing control such that a display device displays event icons representing the plurality of groups of taken pictures in an order on a display screen, wherein said first arrangement change device changes the arrangement of the taken pictures arranged in the picture-taking order by the identical event by said taken picture arrangement device in terms of events by changing the displayed order of the event icons on the display screen.

2. The event-specific taken picture arrangement device according to claim 1, wherein said grouping device includes an event picture group generation device for grouping multiple taken pictures by event to generate a plurality of event picture groups of taken pictures, the plurality of event picture groups generated by said event picture group generation device are grouped by the identical event, and said taken picture arrangement device consecutively arranges the taken pictures included in each of the plurality of event picture groups generated by said event picture group generation device in the picture-taking order by the identical event.

3. The event-specific taken picture arrangement device according to claim 1, wherein the identical event is an identical timing.

4. The event-specific taken picture arrangement device according to claim 1, wherein the identical event is an identical timing and an identical picture-taking place.

5. The event-specific taken picture arrangement device according to claim 1, wherein said multiple taken pictures are associated with event names, and said grouping device groups the multiple taken pictures at an identical timing and with an identical event name as the taken pictures of the identical event.

6. The event-specific taken picture arrangement device according to claim 1, further comprising:

a second arrangement change device for changing the arrangement of the taken pictures arranged by said taken picture arrangement device.

7. The event-specific taken picture arrangement device according to claim 6, wherein said second arrangement change device includes a second display control device for performing control such that the display device displays the taken pictures arranged by said taken picture arrangement device on the display screen, and a taken picture arrangement change command device for giving a change command to the event-specific taken picture arrangement device.

8. The event-specific taken picture arrangement device according to claim 1, wherein said taken picture arrangement device consecutively arranges the taken pictures in the picture-taking order by the identical event according to the changed order of the events indicated by the event icons changed by said first arrangement change device.

9. The event-specific taken picture arrangement device according to claim 1, further comprising:

an electronic album generation device for generating an electronic album using the taken pictures arranged by said taken picture arrangement device.

10. The event-specific taken picture arrangement device according to claim 9, wherein said electronic album generation device arranges pictures of the identical event on an identical page or a page spread.

11. The event-specific taken picture arrangement device according to claim 1, wherein said taken picture arrangement device consecutively arranges the taken picture included in each of the plurality of groups of taken pictures generated by said grouping device in the picture-taking order by the identical event in a time-series order of the identical event.

12. The event-specific taken picture arrangement device according to claim 1, further comprising:

a picture file reception device for receiving the picture-taking image file, the picture-taking image file representing the multiple taken pictures, wherein said grouping device groups the multiple taken pictures represented by the picture-taking image file received by said picture file reception device by the identical event.

13. The event-specific taken picture arrangement device according to claim 1, further comprising a third display control device for performing control such that the display device displays the event icons the display screen.

14. The event-specific taken picture arrangement device according to claim 1, wherein the identical event takes place in a same period of time in different years.

15. An operation control method of an event-specific taken picture arrangement device comprising:

causing a grouping device to read a picture-taking date and a picture-taking place recorded in a picture-taking image file using a computer and group multiple taken pictures by an identical event to generate a plurality of groups of taken pictures based on the read picture-taking date and the read picture-taking place;

causing a taken picture arrangement device to consecutively arrange the taken pictures included in each of the plurality of groups of taken pictures generated by said grouping device in a picture-taking order by the identical event based on at least one of the picture-taking date and the picture-taking place read from the picture-taking image file by the computer;

causing an arrangement change device to change the arrangement of the taken pictures arranged in the picture-taking order by the identical event by the taken picture arrangement device in terms of events; and causing a first display control device to perform control such that a display device displays event icons representing the plurality of groups of taken pictures in an order on a display screen, wherein said arrangement change device changes the arrangement of the taken pictures arranged in the picture-taking order by the identical event by said taken picture arrangement device in terms of events by changing the displayed order of the event icons on the display screen.

16. A non-transitory recording medium storing a computer-readable program which controls a computer of an event-specific taken picture arrangement device to execute:

reading a picture-taking date and a picture-taking place recorded in a picture-taking image file using a computer;

grouping multiple taken pictures by identical event to generate a plurality of groups of taken pictures based on the read picture-taking date and the read picture-taking place;

consecutively arranging the taken pictures included in each of the plurality of generated groups of taken pictures in a picture-taking order by an identical event based on at least one of the picture-taking date and the picture-taking place read from the picture-taking image file by the computer;

changing the arrangement of the taken pictures arranged in the picture-taking order by the identical event in terms of events; and performing control such that a display device displays event icons representing the plurality of groups of taken pictures in an order on a display screen, wherein the arrangement of the taken pictures arranged in the picture-taking order by the identical event in terms of events is changed by changing the displayed order of the event icons on the display screen.

17. An event-specific taken picture arrangement device comprising:

a processor configured to:

read a picture-taking date and a picture-taking place recorded in a picture-taking image file using a computer;

group multiple taken pictures by an identical event to generate a plurality of groups of taken pictures based on the read picture-taking date and the read picture-taking place;

consecutively arrange the taken picture included in each of the plurality of taken picture groups in a picture-taking order by the identical event based on at least one of the picture-taking date and the picture-taking place read from the picture-taking image file by the computer;

change the arrangement of the taken pictures arranged in the picture-taking order by the identical event in terms of events; and perform control such that a display device displays event icons representing the plurality of groups of taken pictures in an order on a display screen, wherein the arrangement of the taken pictures arranged in the picture-taking order by the identical event in terms of events is changed by changing the displayed order of the event icons on the display screen.

* * * * *